United States Patent [19]

Shaw et al.

[11] Patent Number: 4,506,326
[45] Date of Patent: Mar. 19, 1985

[54] APPARATUS AND METHOD FOR SYNTHESIZING A QUERY FOR ACCESSING A RELATIONAL DATA BASE

[75] Inventors: Philip S. Shaw, San Jose; Joseph J. Sordi, Los Gatos; Irving L. Traiger, San Jose, all of Calif.

[73] Assignee: International Business Machines Corporation, Armonk, N.Y.

[21] Appl. No.: 470,821

[22] Filed: Feb. 28, 1983

[51] Int. Cl.³ .............................................. G06F 15/40
[52] U.S. Cl. ..................................... 364/300; 364/900
[58] Field of Search ... 364/200 MS File, 900 MS File, 364/300

[56] References Cited

U.S. PATENT DOCUMENTS 4,283,771  8/1981  Chang ................................ 364/900

OTHER PUBLICATIONS

SQL/Data System Terminal User's Guide, IBM Publication SH24-5016-0.
SQL/Data System Application Programming, IBM Publication SH24-5018-0.
M. W. Blasgen et al., "System R: An Architectural Overview", IBM System Journal, vol. 20, No. 1, 1981, p. 41ff.
Query-by-Example Terminal User's Guide, IBM Publication SH20-2078-0.
M. M. Zloof, "Query-by-Example: A Data Base Language", IBM System Journal, vol. 16, No. 4, 1977, p. 324ff.
D. J. McLeod, "Sequel and Query-by-Example: Translation and Compatibility", IBM Publication RJ 1730, No. 25348, Feb. 27, 1976.

Primary Examiner—Raulfe B. Zache
Attorney, Agent, or Firm—Shelley M. Beckstrand

[57] ABSTRACT

A linear query for accessing a relation data base in computer storage is synthesized from a graphic query input at a user terminal. The graphic query may be one of a combined print query, a target print query, an insert query, a delete query, or an update query. According to one embodiment, the linear query is expressed in Structured Query Language (SQL) syntax, and the graphic query in Query By Example (QBE) syntax. Responsive to a QBE combined print query or target print query, an SQL select query is generated comprising the UNION of one or more generated select statements. Responsive to a QBE delete query, an SQL delete query is generated from the logical OR of generated condition statements including an outer query DELETE and a SELECT* subquery. Responsive to a QBE update query, an SQL update query is generated including a SET clause and any generated WHERE clause and subquery. Responsive to a QBE insert query, an SQL insert query is generated to include an INSERT statement and any generated SELECT statement.

14 Claims, 13 Drawing Figures

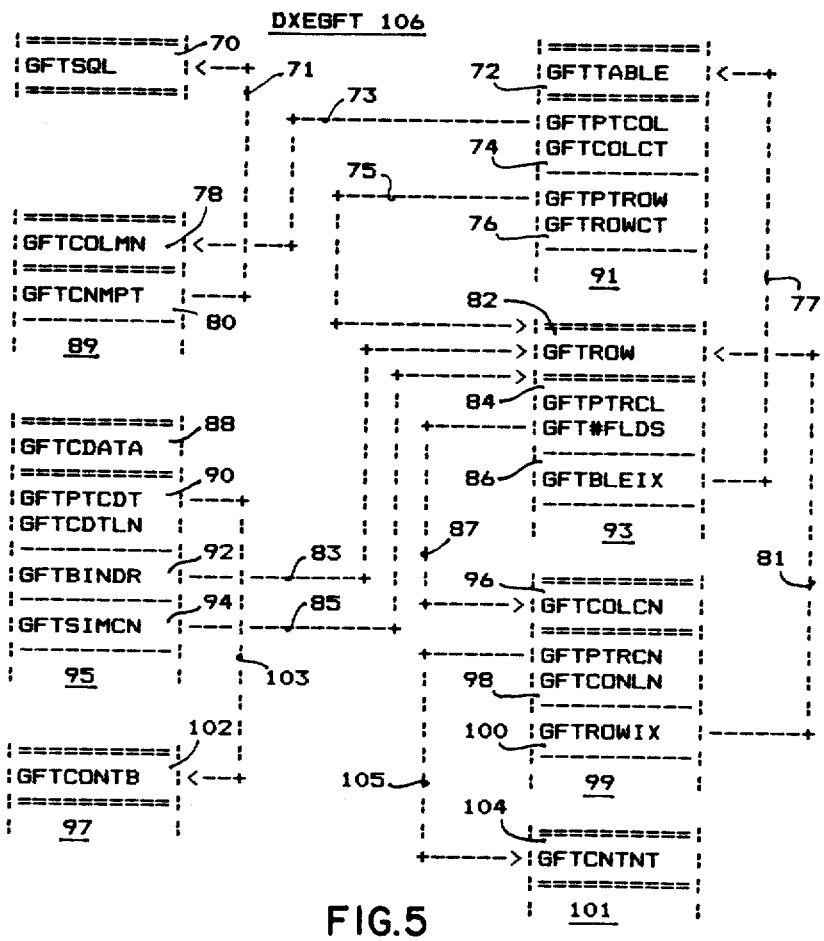

```
        +---------+
        : START   :
        :(DSQGFTM):
        :(DSQGFTT):
        :(DSQGFTS):
        +--+--+---+
      150/  :
       152\ :
+---------+-v-----------+
:GENERATE ROW NAMES     :
:INTO ROW NAME          :
:TABLE GFTROW           :
:HAVING ONE ENTRY       :
:FOR EACH ROW IN A      :
:SOURCE TABLE           :
+---------+-------------+
       154\ :
+---------+-v-----------+
:GENERATE INTO A        :
:COLUMN CONTENT         :
:TABLE GFTCOLCN         :
:AN ENTRY RN.CN AND     :
:DATA FOR EACH DATA     :
:FIELD IN THE ROW       :
:NAME TABLE WHICH       :
:CONTAINS AN EXAMPLE    :
:ELEMENT DEFINITION     :
:OR IMPLIED OPERAND     :
:PREDICATE              :
+---------+-------------+
       156\ :
+---------+-v-----------+
:MARK BOUND COLUMN      :
:CONTENT TABLE          :
:ENTRIES NOT            :
:HAVING AN IMPLIED      :
:CONDITION              :
+---------+-------------+
          :
        +-v-+
        : A :
        +---+

FIG. 7A
```

```
        +---+
        : A :
        +-+-+
       158\ :
+---------+-v-----------+
:GENERATE A BASIC       :
:PREDICATE ENTRY        :
:INTO A CONDITION       :
:TABLE FOR EACH         :
:COLUMN DATA TABLE      :
:ENTRY CONTAINING AN    :
:IMPLIED OPERAND        :
:PREDICATE OR AN        :
:EXAMPLE ELEMENT        :
:HAVING AN IMPLIED      :
:CONDITION              :
+---------+-------------+
       160\ :
+---------+-v-----------+
:GENERATE INTO THE      :
:CONDITION TABLE AN     :
:ENTRY FOR EACH         :
:CONDITION SPECIFIED    :
:IN A CONDITION         :
:BLOCK USING RN.CN      :
:FROM THE COLUMN        :
:DATA TABLE FOR         :
:REFERENCED EXAMPLE     :
:ELEMENTS               :
+---------+-------------+
       162\ :
+---------+-v-----------+
:SELECTIVELY PERFORM    :
:DSQGFTD, DSQGFTP,      :
:DSQGFTI, DSQGFTU,      :
:DSQGFTX TO             :
:SYNTHESIZE A LINEAR    :
:QUERY                  :
+---------+-------------+
          :
        +-----v-----+
        :   END     :
        +-----------+

FIG. 7B
```

```
    +---------+
    :DSQGFTP  :
    :RETRIEVAL:
    :PROCESS  :
    +----v----+                  +---------+
170/     :                       :DSQGFTX  :
    /172  :                      :TARGET   :
+--/-----v---------+             :TABLE    :
:IDENTIFYING SIMPLE:             :PROCESS  :
:P. AND DEPENDENT P.:        182/+----+----+
:ROWS IN SOURCE    :            /     :
:TABLE             :           /184   :
+------------+-----+         +-/------v---------+
             :               :FOR EACH TARGET ROW:
            /174              :OF A TARGET TABLE :
+--/--------v------+          :CONTAINING A P.   :
:FOR ALL SIMPLE P. :          :COMMAND, GENERATE :
:ROWS, GENERATE A  :          :A SELECT STATEMENT:
:SINGLE SELECT     :          +-----------+------+
:STATEMENT         :                      :
+------------+-----+                     /186
             :               +--/--------v------+
            /176              :SELECTIVELY      :
+--/--------v------+          :GENERATE AN ORDER:
:FOR EACH DEPENDENT:          :BY CLAUSE        :
:P. ROW, GENERATE A:          +-----------+-----+
:SELECT STATMENT   :                      :
+------------+-----+                     /188
             :               +--/--------v------+
            /178              :FORM A LINEAR    :
+--/--------v------+          :SELECT QUERY FROM:
:FORM A LINEAR    :           :ANY GENERATED ORDER:
:SELECT QUERY FROM:           :BY CLAUSE AND THE :
:THE UNION OF THE :           :UNION OF ALL      :
:SELECT STATEMENTS:           :GENERATED SELECT  :
+-----------+-----+           :STATEMENTS        :
            :                 +-----------+------+
        180 :                             :
        +/--v----+                    190 :
        : RETURN :                    +/--v----+
        +--------+                    : RETURN :
                                      +--------+
         FIG.8                         FIG.9
```

```
           +---------+
           |DSQGFTI  |
           |INSERT   |
           |PROCESS  |
           +----+----+
    216  /      |
         /218   |
   +----/-------v---------+
   |IDENTIFY THE ROW      |
   |CONTAINING THE I.     |
   |COMMAND AS A SIMPLE   |
   |OR DEPENDENT I. ROW   |
   +----------+-----------+
              |
          /220|
   +----/-----v----------+
   |FOR A SIMPLE I. ROW  |
   |GENERATE ONLY AN     |
   |INSERT STATEMENT     |
   +----------+----------+
              |
          /222|
   +----/-----v----------+
   |FOR A DEPENDENT I.   |
   |ROW GENERATE AN      |
   |INSERT STATEMENT     |
   |AND ONE SELECT       |
   |STATEMENT            |
   +----------+----------+
              |
          /224|
   +----/-----v----------+
   |FORM A LINEAR        |
   |INSERT QUERY TO      |
   |INCLUDE THE INSERT   |
   |STATEMENT AND ANY    |
   |GENERATED SELECT     |
   |STATEMENT            |
   +----------+----------+
              |
         226  |
         ++---v----+
         | RETURN  |
         +---------+
```

FIG. 12

APPARATUS AND METHOD FOR SYNTHESIZING A QUERY FOR ACCESSING A RELATIONAL DATA BASE

BACKGROUND OF THE INVENTION

1. Field of the Invention

This invention relates to a new computing apparatus and method for managing a database. More specifically, it relates to an apparatus and method for synthesizing from a graphic language query an equivalent linear language query for accessing a relational data base.

2. Description of the Prior Art

An example of a linear query language is provided by the IBM Structured Query Language (SQL), as is described in SQL/Data System Terminal User's Guide, IBM Publication SH24-5016-0 and SQL/Data System Application Programming, IBM Publication SH24-5018-0. Such a linear query language provides for defining, accessing, and modifying multiple views of stored tables in a relational data base, such as is described in M. W. Blasgen, et al, "System R: An architectural overview", IBM System Journal, Vol. 20, No. 1, 1981, pp. 41ff.

An example of a graphic query language is provided by the IBM Query-by-Example (QBE), as is described in Query-by-Example Terminal User's Guide, IBM Publication SH20-2078-0. Such a graphic query language also provides for defining, accessing, and modifying stored tables in a data base, and provides a particularly "user friendly" format for the terminal operator, such as is described in M. M. Zloof, "Query-by-Example: a data base language", IBM System Journal, Vol 16, No. 4, 1977, pp. 324ff.

The SQL and QBE query languages have each been designed to access data bases, but heretofore a data base managed by one could not be accessed by the other. Consequently, there exists a need to enable a terminal operator, or user, to access a data base according to a graphic query language even where the data base manager requires that queries be expressed according to a linear query language.

SUMMARY OF THE INVENTION

Therefore, in accordance with the invention, an apparatus and method is provided for converting a query expressed in a graphic query language into an equivalent linear query.

Thus, a method is provided for operating a computing apparatus to translate into a linear query a graphic language query expressed as one or more elements, including example elements and implied operand predicates, appearing in rows and columns of an example table including one or more source and target tables and, optionally, in condition blocks. The method comprises the steps of: generating row names into a row name table having one entry for each row in a source table; for each data field within each row named in said row name table which contains an example element definition or implied operand predicate, generating and loading into a column data table an entry specifying the row name, column name, and data; marking as bound those column data table entries containing an example element not having an implied condition; and generating into a conditions table an entry containing a basic predicate for each column data table entry containing an implied operand predicate or an example element having an implied condition; thereby establishing in the row name table, column data table, and conditions table a data structure for synthesizing into a linear query a graphic language query specified as a target print query, or a combined print query, or an insert query, or an update query, or a delete query.

In accordance with another aspect of the invention, a method is provided for determining from the column data table the row name and column name for example elements referenced in the condition block, and responsive thereto generating into the conditions table a condition entry for each condition specified in a condition block.

In accordance with a further aspect of the invention, a method is provided for synthesizing a graphic combined print query into a linear query comprising the UNION of generated select statements.

In accordance with a further apsect of the invention, a method is provided for synthesizing a graphic target print query into a linear query comprising any generated ORDER BY clause and the UNION of generated select statements.

In accordance with a further aspect of the invention, a method is provided for synthesizing a graphic insert query into a linear insert statement and any generated select statements.

In accordance with a further aspect of the invention, a method is provided for synthesizing a graphic delete query into a linear delete query comprising the logical ORing of condition statements.

In accordance with yet a further aspect of the invention, a method is provided for synthesizing a graphic update query into a linear update query including a SET clause and any generated WHERE clause and subquery.

In accordance with yet a further aspect of the invention, a computing apparatus is provided for translating into a linear query a graphic language query expressed as one or more elements, including example elements and implied operand predicates, appearing in rows and columns of an example table including one or more source and target tables and, optionally, in conditions blocks. The apparatus includes means for generating row names into a row name table having one entry for each row in a source table; means, responsive to each data field within each row named in said row name table which contains an example element definition or implied operand predicate, for generating and loading into a column data table an entry specifying the row name, column name, and data; means for marking as bound those column data table entries containing an example element not having an implied condition; and means for generating into a conditions table an entry containing a basic predicate for each column data table entry containing an implied operand predicate or an example element having an implied condition; thereby establishing in said row name table, column data table, and conditions table a data structure for synthesizing into a linear query a graphic language query specified as a target print query, or a combined print query, or an insert query, or an update query, or a delete query.

BRIEF DESCRIPTION OF THE DRAWINGS

FIG. 1 illustrates an example table of a graphic query which is a named, or source, table.

FIG. 2 illustrates an example table of a graphic query which is an unnamed, or target, table.

FIG. 3 illustrates a graphic query conditions box.

FIG. 5 is a diagram illustrating the control blocks structure implemented according to a preferred embodiment of the invention for synthesizing a linear query from a graphic query.

FIGS. 7A and 7B illustrate the steps performed by the graphic form manager module DSQGFTM 110, table input process module DSQGFTT 114, and source process module DSQGFTS 116 of FIG. 3.

FIG. 8 illustrates the steps performed by the retrieval process module DSQGFTP 120 of FIG. 3.

FIG. 9 illustrates the steps performed by the output, or target, table process module DSQGFTX 126 of FIG. 3.

FIG. 12 illustrates the steps performed by the insert process module DSQGFTI 122 of FIG. 3.

DESCRIPTION OF THE PREFERRED EMBODIMENTS (In Table 49 is set forth a listing of abbreviations used in the description which follows.)

Figure 4:
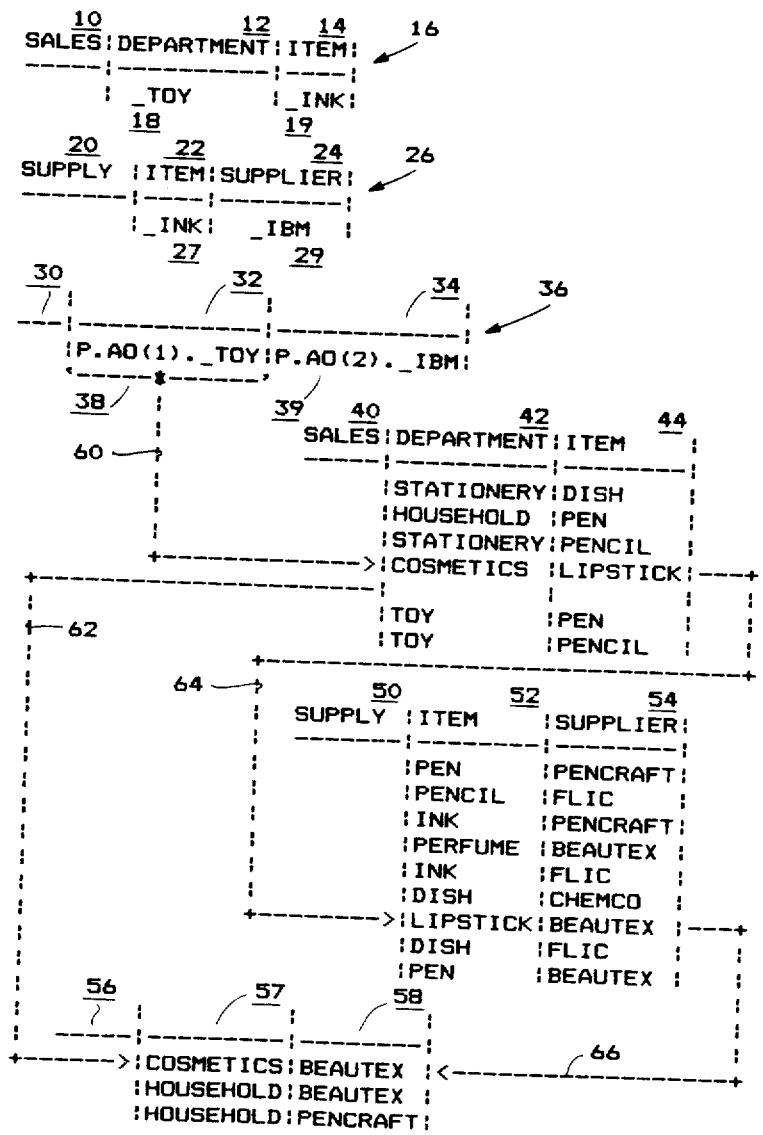
FIG. 4 is a diagram illustrating a relational data base, a typical graphic query for accessing that data base, and the output responding to the query.

Referring to FIGS. 1 through 4, an introductory explanation will be given of an example of a graphic query language—in this instance, the Query By Example (QBE) language. QBE allows a user to express a query by creating examples of the items being queried. The example tables 2 and 4 (also referred to as skeletons), illustrated in FIGS. 1 and 2, and the condition box 6 in FIG. 3, are used to create the example query Q. The items being queried are in a 2-dimensional table form, as is illustrated in FIG. 4, tables 40 and 50. Conditions 8 may appear in a QBE query that limit the selection data 9 from tables 2, 4.

The terms, "example table", "example row", and "example column", are used in referencing an example table. A table is a rectangular array of elements. Example table refers collectively to all the items that appear in an example table 2 or 4. A "skeleton" is another term for an example table. Example row refers collectively to row 7 and data fields 9 that appear in one row of an example table 2, 4; and example column refers collectively to the column name 5 and data fields 9 that appear in one column of an example table 2. (A source table 2 may have a column name field 5, but a target table 4 may not.) Actual tables are made up of elements, each of which appears in a particular row and column of a table. A QBE data field 9 may contain an example element (EE) 18 (FIG. 4), that is an example of the actual elements that appear in a column 42 of a table 40. In the embodiments herein described, an example element name begins with an underscore (_). The elements in a column usually have the same significance. For example, a column may contain the names of people working for a particular business.

A results table 56 is a table created by a QBE query. Each row of a results table may be viewed as containing elements from a single row of an extended Cartesian product (ECP). An ECP is a matrix product formed from one or more source tables 2. The concept of an ECP is used in this description to aid in understanding, but it should be understood that an actual ECP is not necessarily constructed in the preferred embodiments hereinafter described. Since an ECP is a matrix product of all source table 2 rows, the row dimension of the ECP is the product of the row dimensions of the source tables, and the column dimension is the sum of the column dimensions of the source tables.

A row is a duplicate row if each element of the row is a duplicate of each element with the same ordinality in some other row of the table. Elements of a table have the same ordinality as the column and row containing the element. For example, the 3rd element in a row is in the 3rd column, and the 12th element in a column is in the 12th row.

Not all rows of an ECP need be used in formulating a results table 56. That is, a QBE query may contain selection criteria that selects a subset of ECP rows to be used in the formulation of a results table 56. In addition, not all columns need be selected in formulating a results table 56. Thus, a QBE query need not name all columns from selected ECP rows. An element in a results table 56 may be a copy of an element from a column of a selected ECP row. It may be the evaluation of an arithmetic expression containing copies of 1 or more elements from the selected ECP row. It may even be a constant value not copied from a selected row. Generally, no duplicate rows appear in a QBE results table. That is, only one copy of duplicate rows produced by the QBE query are retained in the QBE results table.

Referring to FIG. 4, an example of a QBE query is shown. Appearing on the screen of the terminal user would be example tables 16, 26, and 36 and result table 56. The relational data bases being accessed by the query, and stored in the data storage area of a host computer, are illustrated as tables 40 and 50. Table 16 includes a table name 10 of SALES, column names DEPARTMENT 12, and ITEM 14, and example elements _TOY 18 and _INK 19. Example table 26 includes a table name SUPPLY 20, column names 22, 24 (ITEM and SUPPLIER), and data fields 27 and 29 contain example elements _INK and _IBM. Tables 16 and 26 are source, or named, tables. Table 36, on the other hand, having its name field 30 blank, is a target table, and illustrates the information to be displayed in output table 56 in response to the query of tables 16, 26, and 36.

FIG. 4 illustrates a query where a target table 36 is required, for data from two tables (SALES table 40 and SUPPLY table 50) are to be combined in the output, or results, table 56. (Example element 19 illustrates an example element with an implied condition, the condition implied being that #$@0001.ITEM=#$@000-2.ITEM, where #$@0001 is the row name assigned to the row including data field 19, and #$@0002 is the row name of the row including data field 27, as will be more fully described hereafter.)

The query of FIG. 4 is interpreted as follows. In data field 38 is "P.AO(1)._TOY". "P." is a QBE print command, "AO(1)." is a QBE sort or ordering parameter, and "_TOY" is an example element. _TOY is in the DEPARTMENT column 12 in SALES table 10, thus directing the query, as is illustrated by line 60, to access SALES table 40 and put into the corresponding column 57 of output table 56 data from column 12 that satisfies the query. Similarly, the _IBM in data field 39 references example element _IBM 29 in the SUPPLIER column 24 of SUPPLY table 20, thus directing that data from SUPPLY table 50, SUPPLIER column 54 which satisfies the query be printed out to the result table 56 in column 58. The example elements 19 and 27 provide the link between tables 40 and 50.

Thus, as is illustrated by line 62, output table 56 will include in column 57 the department name from sales table 40, and, as is illustrated by line 66, in column 58 the supplier name from supply table 50 where, as is illustrated by line 64, the item from column 44 is the same as the item from column 52, with data ordered first (as is specified by "AO(1)." in element 38) on department name, and second (as is specified by "AO(2)." in field 39) on supplier name.

Referring now to Tables 1 through 14, the terms essential to an understanding of the metalanguage statement of the procedure of the invention will be given a formal syntactic definition together with semantic rules. Specification progresses from the more elemental to the most complex concepts in order to obviate the need for forward references. The syntax notation used herein is defined in IBM Standards Manual 33-07 (Standard I-B 3-9001 008), with the addition of the additional syntax notation of the "may be repeated" box, and the "with" box. A construct bracketed by a "may be repeated" box may be repeated. When two constructs are separated by a "with" box, both constructs may be present.

Table 1 gives the syntax definition of a character. A character is a digit or a letter or a special character. A special character is any graphic character which is not a digit or a letter.

Table 2 provides the syntax definition of a constant, which is a string constant, or a numeric constant. A string constant is a string of one or more characters, or an identifier. An identifier is a letter followed by one or more letters or digits. A delimited identifier is one or more characters enclosed within quotes (").

Table 3 provides the syntax definitions names. A table name is an identifier or a delimited identifier, optionally preceded by a name qualifier followed by a period (.). A column name is an identifier or a delimited identifier. A name qualifier is an identifier or a delimited identifier. An example element is an underscore (_), followed by one or more letters or digits. A table name is the name of a predefined table. Column names are names of predefined columns. An example element is a variable name for the elements that appear in a particular column of a table. A name qualifier is used to give uniqueness to tables with the same table name.

Table 4 provides the syntax definition of tokens. A token is any one of the following: identifier; example element; numeric constant; order spec; or keyword occurrence. A keyword occurrence is a keyword which is not contained in a character string constant. A keyword is any one of the following sequences of non blank characters: NOT IN LIKE AND OR P. I. U. D. A keyword may also be a character or character string signifying "equal" or "not equal" or "greater than" or "less than" or "greater than or equal to" or "less than or equal to". A spacer is a sequence of one or more blank characters. A token may be preceded and/or followed by a spacer.

Table 5 provides the syntax definition of expressions. An expression is an arith-term, or an expression followed by an infix-op-1 followed by an arith-term. And infix-op-1 is an addition (+) or a subtraction (−) sign. An arith-term is an arith-factor, or an arith-term followed by an infix-op-2 followed by an arith-factor. An infix-op-2 is a division (/) or a multiplication (*) sign. An arith-factor is a primary, which may be preceded by a prefix-op. A prefix-op is an unary plus (+) or an unary minus (−) sign. A primary is a constant, or an example element reference, or an expression enclosed within parentheses. An example element reference (EER) is an underscore (_) followed by a letter or a digit, which may be followed by one or more letters or digits. An example element reference (EER) is a reference to an element value represented by the example element name used in the reference.

Expressions in a QBE query apply to each row of an ECP formed from source tables referenced by the query. QBE processes each row of an ECP formed from source tables referenced by the query. As each row is processed, expressions are evaluated by substituting for each example element reference, a corresponding element value.

Table 6 sets forth the syntax of predicates. A predicate is a basic predicate, or an in-predicate, or a like-predicate, or a null-predicate. A basic predicate is an expression followed by a comp-op followed by an expression. An in-predicate is an expression, followed by IN or NOT IN, followed by one or more constants separated by commas. A like-predicate is an example element, followed by LIKE or NOT LIKE, followed by a character string constant. A null-predicate is an example element followed by a null-comp-op followed by a null-symbol.

A basic predicate compares two values, each derived from the evaluation of the expressions that appear in the basic predicate.

The like-predicate is used to ignore certain character positions in comparing an element to a string constant. The characters 13 and [, for example, may be used in a string constant to indicate, respectively, one or more character positions that are to be ignored.

The in-predicate is evaluated as true if the element referenced by the example element is equal to one or more of the constant values expressed to the right of the IN comp op (comparison operator).

Table 7 provides the syntactic definition of an implied operand predicate. An implied operand predicate appearing in a data field 9 refers to the column in which it appears in an example table. As each row of ECP is processed, a basic predicate is formed from the element in the referenced column followed by the implied predicate.

Table 8 gives the syntax of condition lists. A condition list is a condition, which may be repeated. A condition must appear in a condition box 6. One or more conditions boxes 6 may be used to contain a conditions list. Conditions in a QBE query apply to each row of an ECP formed from source tables referenced by the query. As each row is processed conditions are evaluated by substituting for each example element, the corresponding element value.

Table 9 gives the syntax of a source table list. A source-table-list is a source table, which may be repeated. A source table is one or more tables, each table including a table-name in a table name field 3, and a source entry in at least one data field 9, and, optionally, a column-name in a column name field 5 for the column containing a data field 9. A source entry is an example-element-definition, or an implied-operand-predicate, or empty.

The term "source row" is used to refer collectively to all of the source entries that appear in the same source row. An example element reference (EER) refers to an example element definition (EED) if both contain the same example-element (EE) name. More generally, an item X refers to an item Y if the item X contains an example element reference which refers to an example element definition contained in the item Y.

Two rows R1 and R2 in a query Q are directly linked if one or more of the following is true: R1 refers to R2; R2 refers to R1; there is a condition in the query Q which refers to both R1 and R2. Two rows R1 and R2 in a query Q are linked if one or more of the following is true: R1 and R2 are directly linked; R1 is directly linked to some other row RX in the query Q and RX is linked to R2.

In QBE, one and only one source entry may appear in a source row. Also, in a source table a source entry in a column without a column name must be empty. An example element which can be parsed as either an example element definition or an implied operand predicate shall be parsed as an example element definition. (This latter rule specifies the manner in which the syntactic ambiguity between example element definition and implied operand predicate must be resolved. The ambiguous case involves an implied operand basic predicate with an omitted comp op and an expression which is an example element reference. Such a case is treated as an example element definition.) In this embodiment, the implementation of empty is an entry consisting entirely of blank characters.

Table 10 provides the syntax of a combined print query. A combined-print-query is a combined-print-table, which may be preceded by a condition list, which may be preceded by a source-table-list. A combined-print-table is an example table with a table-name, with at least one column having a column-name and an optional source-entry, and which example table may have one or more rows having a combined-row-attributes in row field 7 and one or more combined-entries in data fields 9. A print-command is designated by "P.". An order-spec is "AO." or "DO.". An integer value in parentheses may optionally appear before the closing".

A set-spec is an all-spec or an unique "unq-spec". An all-spec is represented by "ALL." The unq-spec is represented by "UNQ.", and requires that single copies of duplicate rows be presented in the results table.

The term "combined row" is used to refer collectively to the combined row attributes and the combined entries of a row in a combined print table. A combined print table can be made up of source rows and combined rows. The term combined print row is used to refer to a row of a combined print table, whether it is a source row or a combined row. In a combined print table, the number of source entries in each source row must be equal to the number of column names. (A source entry may, however, be blank.) A combined print row contains at least one print command. (This latter rule resolves the syntactic ambiguity between source row and combined print row.) If the combined row attributes of a combined print row do not contain a print command, then each combined entry in that combined print row that contains an order spec must also contain a print command. If a print command is contained in the i-th combined entry of some combined print row in a combined print table, then every combined print row of that combined print table must either have a print command in its combined row attributes or have a print command in its i-th combined entry. If a print command is contained in the combined row attributes of some combined print row in a combined print table, then every combined print row must either have a print command in its combined row attributes or have a print command in every combined entry. If a combined print table contains more than one order spec, then each order spec must contain an integer. If an integer is contained in an order spec, it may not be duplicated in another order spec in the same combined-print-table. A combined column may not contain more than one order-spec.

A QBE combined-print-query produces a results table that is then displayed on the screen from which the query was submitted. The result contains elements copied from the source table named in the combined print table. A P. (print command) in a column data field 9 indicates that elements from the like named column of the source table are to be copied into the results. A P. in a row field 7 causes elements from all columns 5 named in the query to appear in the results. Examples of elements to be displayed may be used in a query. Thus, a "P._SMITH" appearing in a data filed 9 of a column having a column name 5 of NAME and in a table 2 having table name 3 of EMP will display all the NAMEs, including but not limited to SMITH, for example, from the EMP table. Examples of data to be displayed are optional. That is, if _SMITH were omitted from the preceding example, the results would be the same.

AO. means sort in ascending order, and DO. means sort in descending order. If an order-spec appears in a combined-column, results table rows are sorted by the elements in that column. If more than one order-spec appears in a combined-print-query, data is sorted first by the lowest integer value in an order-spec, then by the each succeeding higher integer value in the remaining order-specs.

Only defined tables may be named in a combined print query. That is, tables that are being queried must already exist and be in the library of tables available to the user. Columns that are referenced must be defined as part of defined tables.

A qualified retrieval is one that contains conditions and/or implied predicates. All of the conditions and all of the basic predicates formed from implied operand predicates are logically ANDed to form a selection criteria. The same rules for the valuation of conditions applies to the evaluation of selection criteria. As each row of an ECP formed from a combined print query is processed only elements from those rows that meet the selection criteria appear in a combined print query results table.

A combined print query may be either a simple retrieval or a query dependent retrieval.

A combined-print-query is a simple retrieval if no source-rows appear in the query. Selection of elements from a row of a table is dependent only upon values of elements in the same row. An ECP is formed for each combined print row that is a copy of the table named in the combined print table. A combined print query is a query dependent retrieval query if it contains one or more source rows linked to a combined-print-row. Conditions 8 in a combined print query may be expressed in one or more condition boxes 6.

When two or more combined print rows appear in the same example table, each combined print row is treated like a separate query. An ECP is formed for each combined print row consisting of a copy of the table referenced by the combined print row and a copy of a source table for each example row linked to the combined print row. The results from each query are then UNIONed to form one results table. If a combined print query contains sort criteria, the results apply only to the final results table.

Table 11 provides the syntax of a target print query. A target-print-query is a source-table-list with a target-print-table, with an optional condition-list. A target-print-table is an example table 4 having in row field 7 a target-row-attributes and in data field 9 a target-entry, the target-row-attributes and target-entry may be repeated. A target-row-attributes is a print-command followed by an optional set-spec. A print command is designated by "P.". A target-entry is an expression, preceded by an optional order-spec, which may be preceded by a print-command.

The term "target print row" is used to refer collectively to all of the target entries in a target row. If the target row attributes of a target print row do not contain a print command, then each target entry contained in that target print row must contain a print command. If a target print table contains more than one order spec, then each order spec must contain an integer value. If an integer value appears in one such order spec, the same value may not appear in another order spec in the same target print table.

The combined print query syntax of this example permits a results table that contains only copies of elements from one source table. The target print query syntax, on the other hand, allows creation of a results table that contains constant values, expressions, and elements from more than one source table. In general, conceptually, an ECP is formed consisting of a copy of a source table for every example row linked to the target row.

A combined print query can be expressed in target print query syntax. When multiple target print rows appear in a target print query, each print row is treated like a separate query just as in a combined print query. An ECP is formed for each query, and the results are UNIONed to form a final results table. Sort criteria applies to the final results table only.

The maintenance queries are insert, delete, update, and create queries.

Table 12 shows the insert query syntax. An insert query is an insert-table, optionally preceded by a condition-list, which may be preceded by a source-table-list. An insert table is a source table 2 having a table-name in table name field 3, a column-name in column field 5, an insert-row-attributes in row field 7, and an insert-entry in data field 9. A plurality of column-name and insert-entry fields may appear. An insert-command is designated by "I.".

The term "insert row" is used to collectively refer to a row containing insert row attributes and one or more insert entries. The number of insert entries in the insert row of an insert table is equal to the number of column names in that insert table. A given column name must not be contained more than once in an insert table. Herein, the table name of the insert table of an insert query must not be the table name of any source table of that insert query. (This restriction is due to the SQL rule that the SQL query spec in an SQL row insertion must not refer to the table being augmented.)

An insert query causes one or more rows to be added to an existing table. A simple insert query is one in which all insert values are constant values. A query dependent insert query is one in which insert values contain elements from one or more source rows. Columns defined for a table that are not named in an insert row receive the null value for each new row inserted in the table. If more than one source row appears in a query dependent query, an ECP is formed that contains a copy of a source table for each source row.

Table 13 provides the syntax of an update query. An update query is an update-table, with an optional-condition list, with an optional source-table-list. The update-command is designated by "U.".

The term "update row" is used to refer collectively to the source entries or the column updated entry. In an update table, the number of update entries in the update row must be equal to the number of column names. A column update row must contain at least one column update item. (This rule resolves the syntactic ambiguity between source row and column update row.) A column-update-entry that contains an update-command may not refer to a source-entry. (This restriction is due to the SQL rule that the SQL query spec in a SQL row update may refer only to columns of the table being updated.)

An update query modifies existing elements in selected rows of a table. An update query is a simple query if the query does not contain source rows. An update query is a query dependent update if the query contains one or more source rows. The conditions for forming an ECP are the same as for insert queries.

Table 14 provides the syntax of a delete query. A delete-query is a delete-table, with an optional condition-list, with an optional source-table-list. A delete table is an example table 2 having a table-name in field 3, a column-name in one or more fields 5, and one or more rows including at least one row with a delete-command in field 7 and a delete-entry in one or more fields 9, and, optionally, a source-entry in zero or more data fields 9. The delete-command is designated by "D.". A delete-entry is a source-item.

The term "delete row" refers collectively to the delete command and delete entries of a row in a delete table.

The number of delete entries in the delete row of a delete table must be equal to the number of column names in that delete table. The table name contained in the delete table of a delete query must not be contained in any source table of that delete query. (This restriction is due to the SQL rule that the SQL query spec in an SQL row deletion must not refer to the table being augmented.)

A delete query deletes rows from a table. A delete query is a simple delete query if no source rows appear in the query. A delete query is a query dependent delete if one or more source rows appear in the query. If more than one delete row appear in a query, each delete row is treated like a separate delete query. An ECP is formed for each delete row consisting of a copy of the table referenced by the delete row and a copy of the table referenced by each source row linked to the delete row.

Referring now to FIG. 5, a description will be given of one possible structure for use in implementing the translation procedure of the invention. GFTSQL 70 is a buffer area in storage into which the SQL query is generated, forming the output of the procedure of FIGS. 7-12. Examples of generated SQL queries are set forth in the tables which follow, and will be described further hereafter.

The collection of tables shown in FIG. 5 is referred to as the DXTGFT tables 106.

GFTTABLE 72 provides one entry for each skeleton, or example table 2 in a query Q. The contents 91 of GFTTABLE 72 are set forth in Table 15, and include GFTPTCOL/GFTCOLCT 74, which provide a pointer 73 to GFTCOLMN 78, and GFTPTROW/GFTROWCT 76, which provide a pointer 75 to GFTROW 82.

GFTCOLMN 78 provides one entry for each column of an example table in a query Q. The content 89 of GFTCOLMN 78 is set forth in Table 16, and includes a GFTCNMPT field 80 providing a pointer 71 to GFTSQL 70.

GFTROW 82 provides one entry for each row of an example table in a query Q. The contents 93 of GFTROW 82 are set forth in Table 17, and include a GFTPTRCL/GFT#FLDS field 84 providing a pointer 87 to GFTCOLCN 96, and a GFTBLEIX field 86 providing a pointer 77 to GFTTABLE 72.

GFTCOLCN 96 includes an entry for each data field 9 in an example table in a query Q. The contents 99 of GFTCOLCN 96 are set forth in Table 18, and include GFTPTRCN/GFTCONLN field 98 providing a pointer 105 to GFTCNTNT 104, and GFTROWIX 100 providing a pointer 81 to GFTROW 82.

GFTCNTNT 104 provides a collection 101 of variable length entries, each entry including the contents of a condition in a data field 9 of an example table.

GFTCDATA 88 provides one entry for each condition which appears in a condition box 6 or in a skeleton data field 9. The contents 95 of GFTCDATA 88 are set forth in Table 41, and include GFTPTCDT/GFTCDTLN 90 which provide a pointer 103 to GFTCONTB 102, GFTBINDR 92 which provides a pointer 83 to GFTROW 82, and GFTSIMCN 94 which provides a pointer 85 to GFTROW 82.

GFTCONTB 102 provides a collection 97 of variable length entries. Each entry is a condition.

The pointers, fields, and flags are initialized during an analysis phase and utilized and further modified during a synthesis phase, as will now be described in connection with FIG. 6. In these DXEGFT 106 tables, by the use of the various indexes, extents, and flags, is logically formed the extended Cartesian product (ECP) previously described. During the analysis phase, GFTT 114 creates in GFTTABLE a row containing the table name 3 for each example table 2 (that is, skeleton) in the QBE query. Then, for each column in a table, GFTT 114 loads into GFTCOLMN at the location indexed by GFTPTCOL/GFTCOLCT 74 the column names GFTCNAME and data peculiar to the column (such as a P. flag GFTCLMP).

Next, GFTT 114 initializes GFTROW 82, with an entry for each row of an example table. The entry contains data about the row, including a generated row name (RN) in field GFTROWNM. Herein, this row name is of the form #@$0000, a unique identifier assigned to each N rows of the query.

GFTT 114 then initializes an entry in GFTCOLCN 96, at the location indexed by GFTPTRCL/GFT#FLDS 84 for the data entries of a row, for each data field contained in the query. COLCN 96 contains information about the data field, and index the location in GFTCNTNT into which the actual data is stored for each data field of the query.

GFTS 116 then creates GFTCDATA 88 and GFTCONTB 102 from information derived from GFTCOLCN 96. GFTCDATA contains information about conditions, and GFTCONTB 102 contains the conditions themselves, with each of tables GFTCDATA 88 and GFTCONTB 102 having an entry for each condition. To build CDATA 88 and CONTB 102, GFTS 116 locates an example element which appears alone in a data, or source, field, and marks it bound in COLCN 96 field GFTBOUND (Table 18). It then looks to see if the same example element in a COLCN 96 entry is bound anywhere else. If it is, a condition is implied, and a condition entry created in GFTCONTB 97. When all of the example elements in GFTCOLCN 96 have thus been processed to identify implied conditions, GFTS 116 then processes data field entries in GFTCOLCN 96 which are not bound example elements; such entries are conditions, and the condition is fetched from the GFTCNTNT 101 location indexed by GFTPTRCN/GFTCONLN 98 and placed into GFTCONTB 97. If an example element appears in a condition in GFTCNTNT 104, it is replaced by the name of a data field where it is bound when loaded into GFTCONTB 97. Finally, GFTS 116 examines the conditions appearing in condition boxes 6 in the query. These have not been previously loaded into any of the DXEGFT 106 tables. Conditions 8 are, therefore, loaded into GFTCONTB 97, with the names (RN.CN) of example elements appearing in the conditions obtained from field GFTCORNM of GFTCOLCN 96.

During the analysis phase, the GFTTABLE 72 entry for the example table containing the P., I. U. or D. (known as the target table, not to be confused with target table 4 of FIG. 2), is identified and pointed to by a pointer GFTGT (not shown).

During the synthesis phase, the DXEGFT 106 tables are examined and updated to synthesize a SQL, or linear language, query as will be described hereafter in greater detail. For example, during the synthesis of a P. query, DSQGFTP 120 is called to build the SQL equivalent. During GFTS 116 processing GFTCDTRF in GFTROW is set if any condition references the row, and GFTXTRMS in GFTROW 82 is set if any condition in the row has cross terms. (Only GFTCDTRF was set if the condition is a simple condition.) GFTP 120 builds the SQL buffer 70. GFTCOLMN 78 is examined to determine the rows that have P. Table names are obtained from GFTTABLE 72 as indexed by GFTGT. During a scan of GFTROW 82, when a P. flag is found indicating that there is at least one condition, GFTDATA 88 is searched, the conditions located in GFTCONTB 102, and added to the SQL buffer 70.

Figure 6:
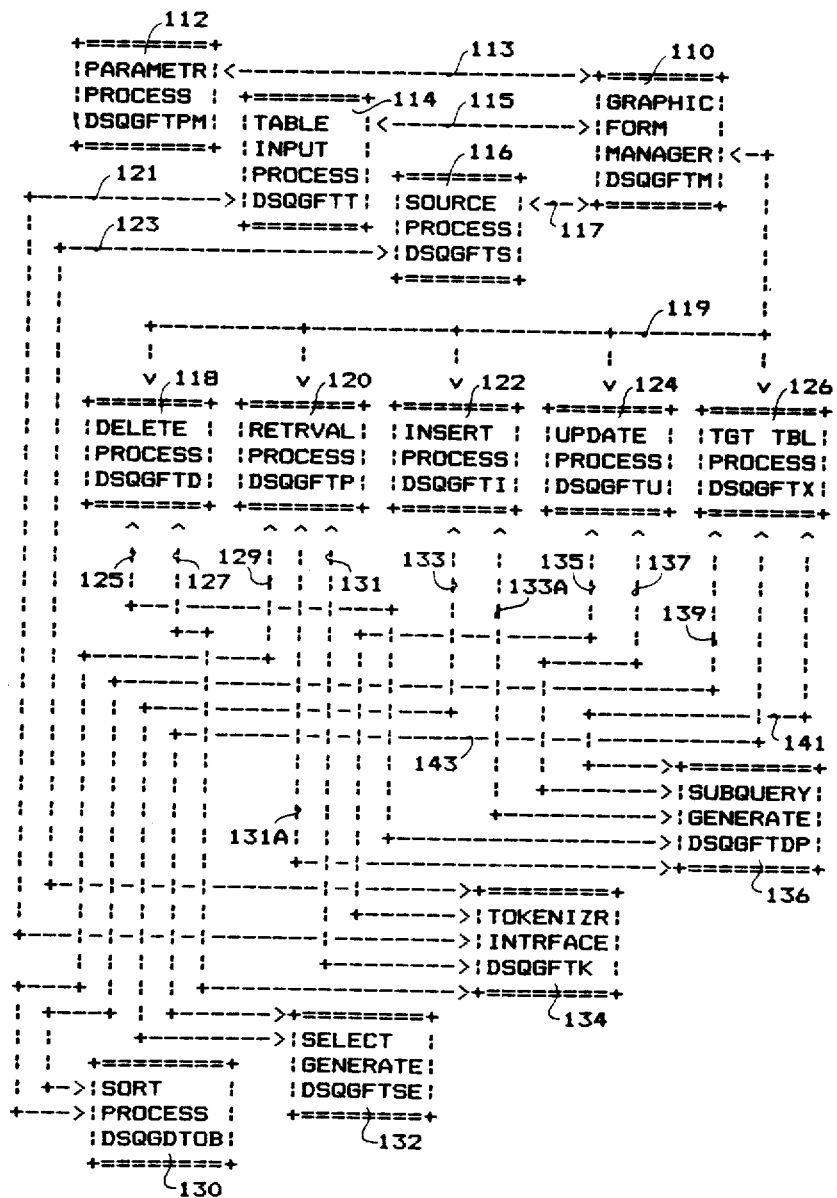
FIG. 6 is a diagram illustrating the processing modules implemented according to a preferred embodiment of the invention for synthesizing a linear query from a graphic query.
Figure 10:
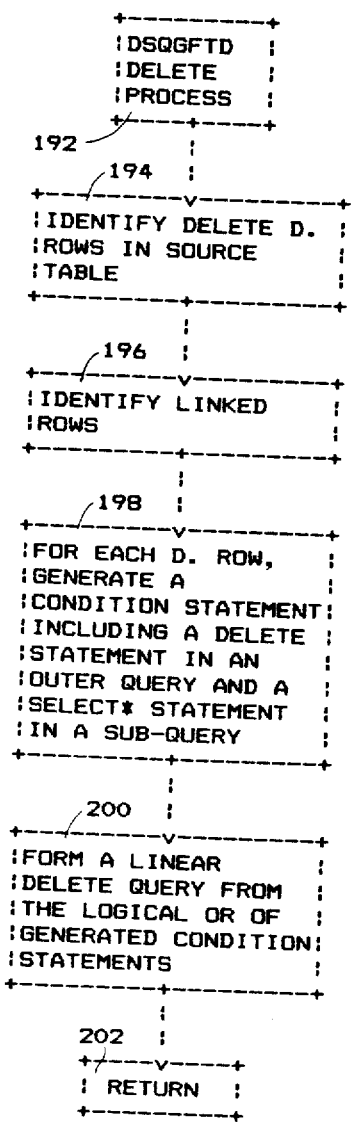
FIG. 10 illustrates the steps performed by the delete process module DSQGFTD 118 of FIG. 3.
Figure 11:
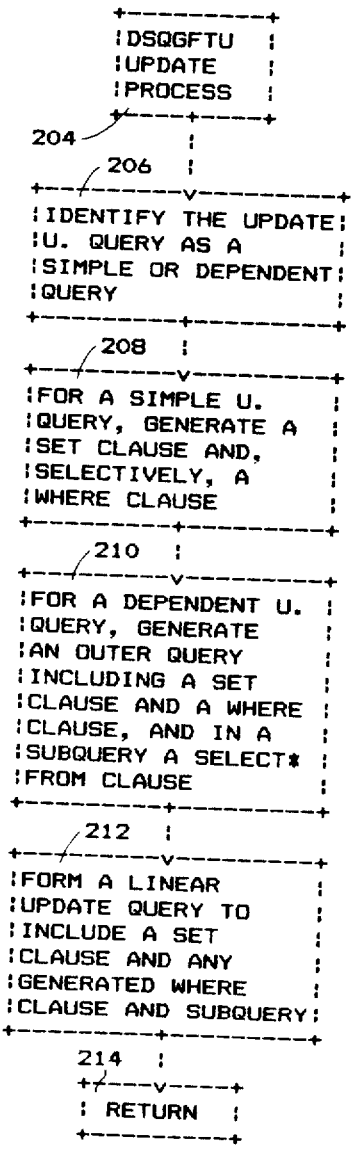
FIG. 11 illustrates the steps performed by the update process module DSQGFTU 124 of FIG. 3.

Referring now to FIG. 6, in connection with FIGS. 7-12 and Tables 20-48, a more detailed description will be given of the various programming modules structured to implement the procedure of the invention.

FIG. 7 describes the analysis phase executed under control of modules GFTM 110, GFTT 114, and GFTS 116. This phase is described in greater detail in Tables 20A and 20B, wherein is set forth the translate-query procedure.

Graphic Form Manager 110 initializes and controls the translation from a user composed QBE query to an equivalent SQL query. Initialization includes the determination of the number of tables, rows, and columns in the user query and the acquisition and subsequent release of the necessary space for the GFT common variables structure DXEGFT 106 comprising the tables and data areas set forth in FIG. 5. GFTM 110 controls the translation by calling the parameter processor 112, as is represented by line 113, to assure the user has passed all required parameters in the query Q, and thereafter by calling the example table analyzer GFTT 114 followed by the source tables and conditions processor GFTS 116, as is illustrated by lines 115 and 117, respectively.

Graphic form example table processor DSQGFTT 114 does the analysis of the example tables contained in the user query Q. It performs the method step 152 of FIG. 7A, as is set forth in more detail in Table 20A at lines 304–306. GFTT 114 packs the tables DXEGFT 106 in FIG. 5 with the qualifier, table, and column names and tests the name fields to assure only valid contents. The row fields of each row are analyzed to see that they contain only valid operators and flags are set in tables DXEGFT 106 to indicate the type of operators used. A row name RN is generated for each example table row that may be used as a correlation variable in the generated SQL query. (Herein, row name and correlation variable are synonyms.) The data fields are analyzed to see that they contain valid operators, and flags are set in DSTGFT accordingly. Also, existing example elements and expressions are put into DXEGFT tables, literal constants not in quotes are stored in quotes, "null" and "not null" are translated to "IS NULL" and "IS NOT NULL" before storing in the tables 106, and example elements that appear alone in a data field 9 are identified. Overall query error checking is also done and the target table 2, 4 identified (that example table that has I., U., P., or D. in the rows. Thus, as used here, "target table" is not just the target table 4 of a target query type.)

In this embodiment, while not essential to the invention, during a parameter substitution phase of GFTT 114 processing, parameters are substituted for each table field starting from the top left most field (the table name field 3) and proceeding from the top to the bottom of each column from left to right. The GFTSQL buffer 70 may be used to contain the table after values have been substituted for parameter names. Later, GFTSQL 70 would be blanked and then used to contain the SQL translation from the query Q. GFTT 114 goes to tokenizer 134 for each serial token it reads in the scan of the query.

Following the scan of the table and column names fields 3, 5, GFTT 114 scans the row field 7. A row field 7 may contain only a P., D., I., or U.. For each row, a correlation variable is created, using the row index for uniqueness. Each correlation variable is identified using an initial set of characters that may not be used as an identifier in the users query, such as the character set #$@. A data field 9 may contain a P., U., AO., DO., sort priority, a condition, or an expression. Each row is tested for invalid conditions. A single row may not have a mix of P., I., U., or D. operators. Only P.'s may appear in both a row field 7 and data fields 9. If a row contains one of these operators, the example table 2 containing the row as a target table. If a preceding table had a row with one of these operators, the query is invalid because only one table may contain a P., or an I., or a U., or a D. operator. If the row is a "pure" source row (it appears in a named table that is not a define query and the row has none of the P., I., U., or D. operators), then it must not have an ALL. or UNQ. specifier. The results of this analysis are stored in the flag bits of the DXEGFT 106 tables.

Graphic form source and condition processing module DSQGFTS 116 processes source fields 9 and conditions 8 that are composed in condition boxes 6. It performs, among other things to be described hereafter, the method steps 154–160 of FIGS. 7A and 7B, as are more fully set forth in Tables 20A and 20B at lines 308–330.

A source field is a data field 9 that contains either a condition or an example element (EE). A source field may be any of the following: (1) a data field in a pure source row, that is, a row in a named example table 2 that has no P., I., U., or D.; (2) a data filed 9 that appears in a P. row of a named table 2; (3) a data field 9 that appears in a D. row of a named table 2; (4) a data field 9 that does not contain a U. but is in a row that contains a U. A source field cannot be any of the following: (1) a data field 9 in an unnamed table 4; (2) a data field 9 containing a U.; (3) a data field 9 in a row containing an I..

If an example element (EE) appears alone in a source field (except for a P., AO., DO., or U.), it is flagged as defining that data field and is said to be "bound" to that data field. An EE is said to be bound to the column and row that it defines; and EE cannot be bound to a row in an output table, a row containing an I. or U. in the row field, a row used as a defining row in a table definition, or a column containing an I., U., or D.. An EE can be bound more than once. When such is the case, an equivalence condition is generated unless the EE is bound in two different rows that are not pure source rows. If the same EE name appears in more than one source field 9, an equivalence condition is implied, and a condition is generated and stored in the DXEGFT tables 106 for the implied condition. When a newly bound EE has the same name as a previously discovered bound EE, a condition is generated. The condition is generated on the first hit to ensure equivalence of EE's when there are more than two bound EE's with the same name. An implied operand condition may appear in a source field 9. If so, the column name 5 is the implied operand that precedes the condition. If no comparison operator precedes the implied operand condition, an "equal" is implied. The condition is completed and stored in the DXEGFT tables 106 using the correlation variable for the containing row and the column name 5 for the containing column. A condition is originated in the GFTCDATA table 88 for a condition being moved to the GFTCONTB table 102. The GFTCDATA table 88 entry contains data about the condition. The GFTCONTB table 102 will contain the condition itself. Entry to GFTCDATA is originated by the first reference in the condition to a particular row and column in a skeleton. The reference may be an EE for a generated condition, an implied reference from a skeleton condition, or an EE that appears in a box condition 8. Since this is the first reference by the condition to a skeleton, it is not known if the condition references more than one row. Initially, it is assumed that only one row is referenced. The correlation variable for the referenced row and column is moved to the GFTCONTB table 102. If the reference is an EE, the correlation variable replaces the EE. Later, if the correlation variable is not necessary, it is stripped from the condition. Conditions that appear in condition boxes 6 are processed, replacing example element (EE) references with a correlation variable and column name for the row and column referenced by the EE. Conditions are error tested to see that no conditions cross reference two rows containing P., U., or D. operators. Data about each condition, such as whether or not the condition references more than one row is determined and stored in DXEGFT tables 106. An EE in a condition is always a referencing EE.

The same EE must be used in a data field to define the row and column to which it refers. If the EE is not so defined, the EE is flagged as not having been defined. A defined EE is marked as having been referenced.

Retrieval Process module DSQGFTP 120 is a graphic form P. processing module which processes rows that contain a P. and are in a named table 2. It performs the procedure steps set forth in FIG. 8, steps 170–180, as are more fully set forth in Tables 21 Translate Combined Print Query and 22 Translate Combined Print Row. Tables 23–29 illustrate various P. queries, and show the equivalent SQL queries generated by implementation of the procedure of the invention.

If a P. row in a named table 2 is not linked to another row, then it is a simple retrieval query, as is shown in Table 23. If such a row is linked to one or more other rows then the query is a query dependent retrieval query, as is shown in Tables 24–29. Two rows are said to be linked if any condition references both rows. Two rows linked to the same row are also linked to each other. The simple retrieval query of Table 23 selects data from each row of a table based solely upon data in the same row. A dependent retrieval query, such as in Tables 24, 25, and 27, selects data from each row of a table based upon data in other tables. A multi-query is one that contains more than one P., as is shown in Tables 26 and 27, or more than one D. row.

A single SOL SELECT statement is generated for all simple retrieval rows. The table name in the table name field 3 of the example table 2 is used in the SQL FROM clause. Conditions that reference a simple retrieval row are logically ANDed to each other. If there is more than one simple retrieval row, the conditions that reference one row ae logically ORed to conditions that reference other simple retrieval rows. All such rows conditions appear in a generated SQL WHERE clause.

A SQL SELECT statement is generated for each query depended row that appears in a retrieval request. A generated FROM clause will contain the table name 3 of the table 2 containing the P. row and the table name of the table containing a linked row for each such linked row. A correlation variable name will follow each table name in the FROM clause. The correlation variable name is the row name of the linked row that cause the table name to be moved to the FROM clause. A unique row name is generated by DSQGETT 114 for each row, having the format #@$0001, #@$0002, . . . , #@$000n, where n is the number of rows in the query. In the examples set forth in the Tables, the "#@$" format is sometimes used, and sometimes the row names are given a letter designation, such as X, Y, which should be interpreted as representing the #@$ format. All conditions that reference the linked rows are logically ANDed into a WHERE clause in the generated SQL, which is stored in GETSQL 70. A SQL UNION statement is generated between each generated SQL request. The UNION removes all duplicates. Therefore, if two or more P. rows are used, the language rule is that all duplicates will be removed. If ALL. is used and there is only one P. row, duplicates ae retained and a subquery must be generated because an outer join might produce spurious duplicates.

The column names 5 of the columns containing P.'s are used in all generated SQL statements. SQL syntax requires that the same columns be selected for UNIONed SELECT statements. For this reason, all rows in an example table 2 that contain P.'s must have them in the same data field. A row field 7 P. is the equivalent of a P. in each of the data fields 9 under named columns 9 of the row. If the query contains one or more sort specifications, a SQL ORDER BY clause is generated.

DSQGFTX 126 is the graphic explicit target processor. This module processes rows that contain a P. and are in an unnamed table 4. This is an output table retrieval query, also known as a target retrieval query. Such a table may be called a target table or an output table. GFTX 126 performs the procedure steps set forth in FIG. 9, as are more fully explained in Tables 30 Translate Target Print Query and 31 Translate Target Print Row. Tables 32–35 set forth examples of P. queries appearing in unnamed tables 4. Table 32 illustrates that a target retrieval may be used to combine data and/or to collect data from more than one table. A target row specified data to be inserted into a new row. Note that no conditions can be expressed in target rows. Table 33 illustrates a multi-target retrieval, with a plurality of P. rows in the target table. Table 34 illustrates an outer join, where rows linked to a target row are joined in an outer query. Table 35 illustrates that a multi-target retrieval translates to UNION.

Thus, according to the procedure of the invention, as implemented in GFTX 126, a SQL SELECT clause is generated for each P. row that exists in a target table. The select list will contain constants or expressions that exist in the data fields 9 of the P. row for which a select statement is generated. Such a P. row references other rows in the request by referencing EE's defined in other rows. Such an EE reference is replaced by the correlation variable (row name, RN, of the format #@$000n,) of a row in which it is defined followed by the table name 3 of the table 2 containing the defining row. A SQL FROM statement is generated that contains the table name (TN) 3 of the table 2 containing a linked row for each such linked row. A correlation variable will follow each such table means. The correlation name is the name of the row that caused the table name to be moved to the FROM statement. All conditions that reference rows that are referenced to the P., or target, row are logically ANDed in a SQL WHERE clause. A SQL UNION statement is generated between each generated SQL request. If the request contains sort specifications, a SQL ORDER BY clause is generated.

DSQGFTD module 118 is the graphic form D., or delete, processor. This module processes rows that contain a D. and are in a named table 2. If such a row is not linked to another row, then it is a simple delete row. If such a row is linked to a delete row, it is a dependent row. Two rows are said to be linked if any condition references both rows. Two rows linked to the same row are linked to each other. GETD 118 executes the procedure set forth in FIG. 10, as is more fully explained in Table 36 Translate Delete Query. Tables 37–39 provide examples of a simple delete, a dependent delete, and a multi delete, respectively.

According to the GFTD 118 process, a SQL DELETE clause and a SQL FROM clause are generated first. The table name 3 of the example table 2 containing the D.'s is used in the FROM clause. If there are any conditions, a SQL WHERE clause is generated. Conditions that reference only a simple D. row are logically ANDed in the WHERE clause. If there are query dependent rows, a SQL subquery is generated for each set of dependent rows linked to each other and to the D. row. Each such subquery is logically ANDed, using the SQL EXISTS comparison operator, to conditions or subqueries previously generated in the WHERE clause.

A SQL SELECT* is generated in each subquery, followed by a FROM clause. (SELECT* is a shorthand notation in SQL for selecting all of the fields of a row.) A subquery FROM clause contains a table name 3 of the table 2 containing a linked row for each such linked row. A correlation variable name will follow each such table name in the FROM clause. The correlation variable name is the row name RN of the linked row. All conditions that reference the linked rows are logically ANDed into a WHERE clause in the generated subquery. If there is more than one D. row, the conditions that reference one D. row are logically ORed to conditions that reference a different D. row.

Update processing DSQGFTU module 124 processes U. commands. GFTU 124 performs the procedure set forth in FIG. 11, as is more fully described in Table 40 Translate Update Query. Table 41 provides an example of a simple update query U., and its equivalent SQL, and Table 42 illustrates a dependent update.

GFTU 124 generates a single SQL UPDATE statement for an update query U. One and only one U. row may appear in a QBE query Q. Any column containing a U. may only reference other columns in the U. row. This is because of the SQL restriction that one can only update from the same row of the same table. A SQL SET statement is generated using either constant values or expressions that reference other columns in the same row. If a U. row is not linked to another row then it is a simple update query. If the U. row is linked to one or more, the query is a dependent update query. Two rows are said to be linked if any condition references both rows. Two rows linked to the same row are also linked to each other.

Conditions that reference only the U. row are logically ANDed to each other and are generated into a SQL WHERE clause. If the query is a simple update, the SQL is complete. If the query is a query dependent update, then a SQL subquery is generated and ANDed to any conditions already in the WHERE clause using the SQL EXISTS connector to connect the subquery. The subquery FROM clause will contain the table name 3 of the table 2 containing a linked row for each such linked row. A correlation variable name will follow each such table name in the FROM clause. The correlation variable name is the row name of the linked row that cause the table name to be moved to the FROM clause. All conditions that reference the linked rows are logically ANDed into a WHERE clause in the generated SQL subquery.

DSQGETI module 122 processes insert queries I. GFTI 122 executes the procedure set forth in FIG. 12, as is more fully described in Table 43 Translate Insert Query. Table 44 is an example of a simple insert query, and Table 45 of a dependent insert query, each setting forth QBE query format and the equivalent SQL query. In translating the queries of Tables 44 and 45, an insert I. row is considered a target row (not to be confused with a row of a target table 4.)

GETI 122 generates a single SQL INSERT statement for a QBE insert query I. If only constants appear in the insert row, then it is a simple insert query and only the INSERT statement is generated. If another row in the request is linked to an insert row (a dependent insert row) than a SELECT statement is generated after the SQL INSERT statement. One and only one such statement is generated. The SELECT list will contain constants or expressions that exist in the data fields 9 of the I. row as well as references to columns 5 in other tables 2 linked to the I. row. A SQL FROM statement is generated that contains a table name 3 of any table 2 containing a linked row for each such linked row. A correlation variable follows each such table name. The correlation variable is a unique name generated and stored in DXEGFT 106 by DSQGFTT 114 for each row in the query. All conditions that reference rows that are referenced in the I. row are logically ANDed in a SQL WHERE clause.

Tokenizer interface module DSQGFTK 134 is a service module used by DSQGFTU 124, DSQGFTD 118, DSQGFTP 120, DSQGFETT 114, and DSQGFTS 116 to do token processing, as is indicated by lines 121, 123, 127, 131, and 135.

Subquery generate module DSQGFTDP 136 is used when the query being processed is a dependent retrieval query, and is called by GFTX 126, GFTU 124, GFTI 122, GFTD 118, and GFTP 120, as is indicated by lines 141, 137, 133A, 125, and 131A, respectively. It serves two functions, selected by the setting of a flag FRWHR. If, when called, FRWHR is off, one or more rows are assumed to be specified as linked, and this module examines the conditions that exist in the query, flagging conditions that reference linked rows and flagging additional rows that are linked by conditions that reference already linked rows. A hit flag is turned on each time a condition is determined to be referenced or a row is determined to be linked. When called, and the FRWHR flag is on, this module generates the SQL FROM and WHERE clauses using the flagged rows and conditions. The FROM clause calculates the name 3 of the table 2 that has a linked row followed by the correlation variable name for each linked row. The SQL WHERE clause contains all of the flagged conditions logically ANDed together.

DSQGFTSE module 132 is called by GFTI 122 (line 133) or GFTX 126 (line 143) to generate a SQL SELECT list entry, using the token string pointed to upon entry to the module. The contents of a data field are moved into the SQL buffer 70. If the data field contains an example element, the example element is marked as referenced, and all rows in which the example element is defined are flagged as linked to the row that contains the data field. A trailing comma is moved into the SQL buffer 70 to separate the SELECT field from the next field to be moved into the buffer. The calling module removes the last comma.

DSQGDTOB 130 generates a SQL ORDER BY clause, and is called by GFTP 120 (line 129) or GFTX 126 (line 139).

Table 46 sets forth the Constuct Table Expression procedure that is called by Tables 22, 31, 40, and 43 to produce an SQL table expression. Table 47 sets forth the Construct Search Conditions procedure that is called by Tables 36, 40, 46, and by recursion, Table 47, to produce an SQL search condition (SC3). Table 48 illustrates the SQL equivalent of a query including a plurality of condition boxes, illustrating that conditions referencing the same row are logically ANDed in the equivalent SQL query, and that conditions referencing different rows (P. or D.) are ORed.

TABLE 1

| CHARACTER SYNTAX | |
| --- | --- |
| character | : : = digit:letter:special-character |
| digit | : : = 0:1:2:3:4:5:6:7:8:9 |
| letter | : : = A:B:C:D:E:F:G:H:I:J:K:L:M:N:O:P:Q :R:S:T:U:V:W:X:Y:Z:a:b:c:d:e:f |

TABLE 1-continued
CHARACTER SYNTAX

| | | |
|---|---|---|
| special-character | ::= | :g:h:i:j:k:l:m:n:o:p:q:r:s:t: u:v:w:x:y:z:#:@:$ any EBCDIC graphic character which is not a digit or letter |

TABLE 2
CONSTANTS SYNTAX

| | | |
|---|---|---|
| constant | ::= | string-constant:numeric constant |
| string-constant | ::= | 'character . . .':identifier |
| numeric-constant | ::= | integer-constant:decimal-constant :floating-constant |
| integer-contant | ::= | [+:−]integer |
| integer | ::= | digit . . . |
| decimal-constant | ::= | [+:−]{integer.:[integer].integer} |
| floating-constant | ::= | {decimal-constant :integer-constant} Einteger-constant |
| identifier | ::= | letter[letter:digit:_]. . . |
| delimite-identifier | ::= | "character . . . " |

TABLE 3
NAMES SYNTAX

| | | |
|---|---|---|
| table-name | ::= | {name-qualifier.}identifier :delimited-identifer |
| column-name | ::= | identifier:delimited-identifier |
| name-qualifier | ::= | identifier:delimited-identifier |
| example-element | ::= | _{letter:digit[letter:digit . . . ]} |

TABLE 4
TOKENS SYNTAX

| | | |
|---|---|---|
| keyword | ::= | NOT:IN:LIKE:AND:OR:=:−=:>:>=:<: <=:−:P.:I.:U.:D. |
| keyword-occurence | ::= | a keyword which is not contained in string-constant |
| tokken | ::= | identifier:example-element :numeric-constant-order-spec :keyword-occurrence |
| spacer | ::= | a sequence of one or more blank characters |

TABLE 5
EXPRESSIONS SYNTAX

| | | |
|---|---|---|
| expression | ::= | arith-term :expression infix-op-1 arith-term |
| infix-op-1 | ::= | +:− |
| arith-term | ::= | arith-factor :arith-term infix-op-2 arith-term |
| infix-op-2 | ::= | *:/ |
| arith-factor | ::= | [prefix-op] primary |
| prefix-op | ::= | constant :example-element-reference :(expression) |
| example-element- | ::= | _{letter:digit}[letter:digit . . . ] |

TABLE 6
PREDICATES SYNTAX

| | | |
|---|---|---|
| predicate | ::= | basic-predicate:in-predicate :like-predicate:null-predicate |
| basic-predicate | ::= | expression comp-op expression |
| comp-op | ::= | =:−=:>:<:>=:<=:− |
| in-predicate | ::= | expression [NOT] IN (constant [,constant] . . . ) |
| like-predicate | ::= | example-element [NOT] LIKE character-string-constant |
| null-predicate | ::= | example-element null-comp-op null-symbol |
| null-comp-op | ::= | =:−=:− |

TABLE 6-continued
PREDICATES SYNTAX

| | | |
|---|---|---|
| null-symbol | ::= | NULL |

TABLE 7
IMPLIED OPERAND PREDICATE SYNTAX

| | | |
|---|---|---|
| implied-operand-predicate | ::= | implied-operand-basic-predicate :implied-operand-in-predicate :implied-operand-like-predicate :implied-operand-null-predicate |
| implied-operand-basic-predicate | ::= | [comp-op] expression |
| implied-operand-in-predicate | ::= | IN (constant [,constant] . . . ) |
| implied-operand-like-predicate | ::= | LIKE character-string-constant |
| implied-operand-null-predicate | ::= | [null-comp-op] null-symbol |

TABLE 8
CONDITION LISTS SYNTAX

| | | |
|---|---|---|
| condition-list | ::= | condition (may be repeated) |
| condition | ::= | boolean-term :condition OR boolean-term |
| boolean-term | ::= | boolean-factor :boolean-term AND boolean-factor |
| boolean-factor | ::= | [NOT] boolean-primary |
| boolean-primary | ::= | predicate: (condition) |

TABLE 9
SOURCE TABLE LISTS SYNTAX

| | | |
|---|---|---|
| source-table-list | ::= | source-table (may be repeated) |
| source-table | ::= | table-name [column-name] source-entry (may be repeated) |
| source-entry | ::= | example-element-definition :implied-operand-predicate :empty |
| example-element-definition | ::= | example-element |
| empty | ::= | an entry consisting entirely of blank characters |

TABLE 10
COMBINED PRINT QUERY SYNTAX

| | | |
|---|---|---|
| combined-print-query | ::= | [source-table-list] with [condition-list] with combined-print-table |
| combined-print-table | ::= | table-name column-name [ source-entry ] (may be repeated) |

TABLE 10-continued
COMBINED PRINT QUERY SYNTAX

[with]

| combined-row-attributes | combined-entry — |

[may be repeated]

| | | |
|---|---|---|
| combined-row-attributes | ::= | [print-command][set-spec] |
| combined-entry | ::= | [print-command][order-spec] source-entry |
| print-command | ::= | P. |
| order-spec | ::= | <AO:DO>[(integer)]. |
| set-spec | ::= | all-spec:unq-spec |
| all-spec | ::= | ALL. |
| unq-spec | ::= | UNQ. |

TABLE 11
TARGET PRINT QUERY SYNTAX

| | | |
|---|---|---|
| target-print-query | ::= | source-table-list |
| | | [with] |
| | | [condition-list] |
| | | [with] |
| | | target-print-table |
| target-print-table | ::= | |

| target-row-attributes | target-entry — |

[may be repeated]

| | | |
|---|---|---|
| target-row-attributes | ::= | print-command[set-spec] |
| print-command | ::= | P. |
| target-entry | ::= | [print-command] [order-spec]expression |
| order-spec | ::= | {AO:DO}[(integer)]. |

TABLE 12
INSERT QUERY SYNTAX

| | | |
|---|---|---|
| insert-query | ::= | [source-table-list] |
| | | [with] |
| | | [condition-list] |
| | | [with] |
| | | insert-table |
| insert-table | ::= | |

| table-name | column-name— |
|---|---|
| insert-row-attributes | insert-entry— |

| | | |
|---|---|---|
| insert-row-attributes | ::= | insert-command |
| insert-command | ::= | I. |
| insert-entry | ::= | {expression:null-symbol} |

TABLE 13
UPDATE QUERY SYNTAX

| | | |
|---|---|---|
| update-query | ::= | [source-table-list] |
| | | [with] |
| | | [condition-list] |
| | | [with] |
| | | update-table |

TABLE 13-continued
UPDATE QUERY SYNTAX

| | | |
|---|---|---|
| update-table | ::= | column-update-table |
| column-update-table | ::= | |

| table-name | column-name— |
|---|---|
| | column-update-entry— |

| | | |
|---|---|---|
| column-update-entry | ::= | {column-update-item:source-item} |
| column-update-item | ::= | update-command{expression :null-symbol} |
| update-command | ::= | U. |

TABLE 14
DELETE QUERY SYNTAX

| | | |
|---|---|---|
| delete-query | ::= | [source-table-list] |
| | | [with] |
| | | [condition-list] |
| | | [with] |
| | | delete-table |
| delete-table | ::= | |

| table-name | column-name |
|---|---|
| delete-command | delete-entry |

[may be repeated]

[with]

[:source-entry:—]

[may be repeated]

| | | |
|---|---|---|
| delete-command | ::= | D. |
| delete-entry | ::= | source-item |

TABLE 15
GFTTABLE (ONE ENTRY PER SKELETON)

| | |
|---|---|
| GFTOWNER | QUALIFIER NAME IN NAME FIELD OR BLANKS |
| GFTTBLNM | OBJECT NAME IN NAME FIELD OR BLANKS |
| GFTPTCOL | INDEX TO 1ST GFTCOLMN ENTRY FOR SKELETON |
| GFTCOLCT | # COLUMNS IN THIS SKELETON |
| GFTNOTBL | # COLUMNS HAVING A NAME IN THIS SKELETON |
| GFTPTROW | INDEX TO 1ST GFTROW ENTRY FOR THIS SKELETON |
| GFTROWCT | # OF ROWS IN THIS SKELETON |
| GFTTBLFL | TABLE FLAGS |
| GFTD | SET IF D. WAS USED IN SKELETON |
| GFTI | SET IF I. WAS USED IN SKELETON |
| GFTU | SET IF U. WAS USED IN SKELETON |
| GFTP | SET IF P. WAS USED IN SKELETON |
| GFTUNMD | SET IF SKELETON IS UNNAMED |
| GFTSRTIN | SET IF SORT DATA IN SKELETON |

TABLE 16
GFTAORDR (ONE ENTRY PER COLUMN)

| | |
|---|---|
| GFTCNAME | COLUMN NAME OR BLANKS |
| GFTCOLFL | COLUMN FLAGS |
| GFTHASCT | SET IF COLUMN HAS CONTENTS |
| GFTCLMP | SET IF COLUMN HAS A P. |
| GFTAORDER | SET IF AO APPEARS IN COLUMN |
| GFTDORDR | SET IF DO APPEARS IN COLUMN |
| GFTPRIOR | SORT PRIORITY IN COL (OR 0) |
| GFTCNMPT | POINTER TO GFTSQL BUFFER WHERE ASSOCIATED COLUMN NAME APPEARS |

TABLE 17

| GFTROW (ONE ENTRY PRE ROW) | |
|---|---|
| GFTPTRCL | INDEX TO 1ST GFTCOLCN ENTRY FOR THIS ROW |
| GFT#FLDS | #OF NOT EMPTY DATA FIELDS IN ROW |
| GFTBLEIX | INDEX TO GFTTABLE ENTRY FOR THIS ROW |
| GFTROWNM | GENERATED ROW NAME (RN) |
| GFTROWFL | ROW TABLE FLAGS |
| GFTHASEE | SET IF ROW HAS EXAMPLE ELEMENT (EE) |
| GFTROWD | SET IF ROW FIELD HAS A D. |
| GFTROWI | SET IF ROW FIELD HAS AND I. |
| GFTROWU | SET IF ROW FIELD HAS A U. |
| GFTROWP | SET IF ROW FIELD HAS A P. |
| GFTALL | SET IF ROW FIELD HAS AN ALL. |
| GFTUNQ | SET IF ROW FIELD HAS UNQ. |
| GFTSRCIN | SET IF 'PURE SOURCE' ROW (THAT IS, HAS NO P.I.U. OR D.) |
| GFTCP | SET IF A COLUMN IN ROW HAS A P. |
| GFTCD | SET IF COLUMN IN ROW HAS A D. |
| GFTCI | SET IF COLUMN IN ROW HAS AN I. |
| GFTCU | SET IF COLUMN IN ROW HAS A U. |
| GFTCDTRF | SET IF AN EXAMPLE ELEMENT (EE) BOUND TO A COLUMN IN ROW IS USED IN A CONDITION |
| GFTTRMS | SET IF ROW HAS AN EE BOUND IN ANOTHER ROW -- SUCH ROWS ARE SAID TO HAVE CROSS TERMS |
| GFTQDI | SET IF THIS ROW IS AN INSERT ROW AND IS QUERY DEPENDENT |
| GFTLNKD | SET IF ROW IS A SOURCE ROW LINKED TO AN OUTPUT TABLE |

TABLE 18

| GFTCOLCN (ONE ENTRY PER DATA FIELD) | |
|---|---|
| GFTPTRCN | INDEX TO GFTCNTNT TABLE ENTRY FOR THIS DATA FIELD |
| GFTCONLN | LENGTH OF GFTCNTNT ENTRY FOR THIS FIELD |
| GFTROWIX | INDEX TO GFTROW CONTAINING THIS DATA FIELD |
| GFTRCORNM | CORRELATION VARIABLE NAME |
| GFTRNME | NAME OF ROW (RN) HAVING THIS FIELD |
| GFTDOT | CHARACTER FOLLOWING CORRELATION VARBLE |
| GFTCNME | NAME OF COLUMN (CN) HAVING THIS FIELD |
| GFTEE | AN EXAMPLE ELEMENT IF IT APPEARS ALONE IN THE FIELD, BLANKS IF THERE IS NO EE |
| GFTCLCFL | GFTCOLCN FLAGS |
| GFTCOLP | SET IF P. APPEARS IN FIELD |
| GFTCOLD | SET IF D. APPEARS IN FIELD |
| GFTCOLI | SET IF I. APPEARS IN FIELD |
| GFTCOLU | SET IF U. APPEARS IN FIELD |
| GFTSORTI | SET IF SORT DATA IN FIELD |
| GFTALONE | SET IF EE ALONE IN DATA FIELD |
| GFTBOUND | SET IF EE IS BOUND |
| GFTREFCK | SET IF BOUND EE IS REFERENCED |

TABLE 19

| GFTCDATA (ONE ENTRY PER CONDITION; CONDITION CAN APPEAR IN CONDITION BOX OR IN SKELETON DATA FIELD) | |
|---|---|
| GFTPTCDT | INDEX TO A CONDITION IN GFTCONTB TABLE |
| GFTCDTLN | LENGTH OF CONDITION |
| GFTBINDR | INDEX TO D., U., OR P. ROW REFERENCED BY THE CONDITION (0 IF NO SUCH REFERENCE) |
| GFTSIMCN | INDEX TO A ROW IF CONDITION CONTAINING EE's BOUND ONLY TO THAT |
| GFTCNTFL | CONDATA FLAGS |
| GFTPSRC | SET IF THE CONDITION CONTAINS AN EE BOUND TO A ROW HAVING A P. |

TABLE 19-continued

| GFTCDATA (ONE ENTRY PER CONDITION; CONDITION CAN APPEAR IN CONDITION BOX OR IN SKELETON DATA FIELD) | |
|---|---|
| GFTDSRC | SET IF CONDITION CONTAINS AN EE BOUND TO A ROW HAVING A D. |
| GFTUSRC | SET IF CONDITION CONTAINS AN EE BOUND TO A ROW HAVING A U. |
| GFTINSRC | SET IF CONDITION IS IN A SKELETON ROW |
| GFTSRC | SET IF CONDITION CONTAINS AN EE BOUND TO ANY QUERY ROW |
| GFTGEND | CONDITION IS GENERATED BY THE GT |
| GFTREFD | CONDITION IS REFERENCED IN GENERATED SQL |
| GFTWH | SET IF CONDITION IS TO GO IN A GENERATED SQL OUTER QUERY |
| GFTSQWHR | SET IF CONDITION REFERENCES A SQL SUBQUERY |

TABLE 20A

| TRANSLATE-QUERY | | |
|---|---|---|
| 300 | OPERATION: | TRANSLATE-QUERY |
| 301 | INPUT: | QBE QUERY Q. |
| 302 | RESULT: | AN SQL INTERACTIVE STATEMENT IST |
| 304 | REPLACE EACH NAME IN Q THAT IS AN IDENTIFIER WITH AND EQUIVALENT DELIMITED-IDENTIFIER BY PLACING OPENING AND CLOSING " AROUND THE IDENTIFIER. | |
| 306 | FOR EACH ROW (R) OF EACH NAMED TABLE (NT) IN THE QUERY Q, GENERATED A ROW NAME (RN) AND ASSOCIATE RN WITH R. LET ROW NAME BE IDENTICAL TO SQL RELATION NAME (RN) | |
| 308 | FOR EACH EXAMPLE ELEMENT DEFINITION (EED) OF AND EXAMPLE ELEMENT (EE): | |
| 310 | CREATE AN EXAMPLE ELEMENT NAME IN THE FORM, RN:CN, WHERE RN IS THE ROW NAME AND CN IS THE COLUMN NAME OF THE ROW AND COLUMN CONTAINING THE EXAMPLE ELEMENT DEFINITION (EED). | |
| 312 | FOR EACH I>1 TIMES A PARTICULAR EE IS DEFINED, GENERATE A BASIC PREDICATE P OF THE FORM: RN.CN(i)=RN.CN(1). | |
| 314 | ADD P TO THE CONDITION LIST OF Q. | |
| 316 | FOR EACH IMPLIED OPERAND PREDICATE (IOP) CONTAINED IN Q: | |
| 318 | IF COMP OP HAS BEEN OMITTED FROM IOP AND THE IOP IS NOT NULL, THEN INSERT AN "=" IN FRONT OF THE IOP. | |
| 320 | IF THE IOP IS NULL, THEN INSERT AN "IS" IN FRONT OF THE IOP. | |

TABLE 20B

| TRANSLATE QUERY (CON'T.) | |
|---|---|
| 322 | CONSTRUCT AN EXAMPLE ELEMENT DEFINITION (EED), RN.CN WHERE RN IS THE ROW NAME AND CN IS THE COLUMN NAME OF THE ROW AND COLUMN CONTAINING THE IOP. |
| 324 | CONSTRUCT A BASIC PREDICATE (P) BY PLACING THE EXAMPLE ELEMENT DEFINITION (EED) IN FRONT OF THE IOP. |
| 324 | ADD P TO THE CONDITION IN A CONDITIONS BOX |
| 326 | ADD P TO THE CONDITION LIST OF Q. |
| 328 | FOR EACH CONDITION IN A CONDITIONS BOX IN Q: |
| 330 | REPLACE ALL OCCURRENCES OF AN EXAMPLE ELEMENT (EE) WITH AN EXAMPLE ELEMENT NAME (RN.CN) CREATED FOR ANY EXAMPLE ELEMENT DEFINITION (EED) OF EE TO OBTAIN AN SQL SEARCH CONDITION SC. |
| 332 | DEPENDING ON WHETHER THE QBE QUERY Q IS A TARGET PRINT QUERY, OR A COMBINED PRINT QUERY, OR AN INSERT QUERY, OR AN UPDATE QUERY, OR A DELETE QUERY |

TABLE 20B-continued
TRANSLATE QUERY (CON'T.)

PERFORM RESPECTIVELY
TRANSLATE-TARGET-PRINT-QUERY, OR
TRANSLATE-COMBINED-PRINT-QUERY, OR
TRANSLATE-INSERT-QUERY, OR
TRANSLATE-UPDATE-QUERY, OR
TRANSLATE-DELETE-QUERY
TO OBTAIN A SQL INTERACTIVE STATEMENT
(IST).
334 RETURN IST.

TABLE 21A
TRANSLATE COMBINED PRINT QUERY

| | | |
|---|---|---|
| 430 | OPERATION: | TRANSLATE-COMBINED-PRINT-QUERY |
| 432 | CALLED BY: | TRANSLATE-QUERY |
| 434 | RESULT: | AN SQL INTERACTIVE STATEMENT |
| 436 | | LET CPT BE THE COMBINED PRINT TABLE CONTAINED IN THE QUERY Q. |
| 438 | | IF CPT CONTAINS EXACTLY ONE COMBINED PRINT ROW (CPR), THEN: |
| 440 | | PERFORM TRANSLATE-COMBINED-PRINT-ROW (CPR), TO OBTAIN AN SQL QUERY SPEC (QS). |
| 442 | | CONSTRUCT AN SQL QUERY EXPR (QE) CONSISTING OF QS. |
| 444 | | IF CPT CONTAINS N>1 COMBINED PRINT ROWS, THEN: |
| 446 | | FOR i FROM 1 TO n: |
| 448 | | LET CPRi BE THE i-TH COMBINED PRINT ROW OF CPT. |
| 450 | | PERFORM TRANSLATE-COMBINED-PRINT-ROW (CPRi), TO OBTAIN AN SQL QUERY SPEC (QSi). |
| 452 | | CONSTRUCT AN SQL QUERY EXPR (QE) CONTAINING THE N SQL QUERY SPECS (QSi) SEPARATED BY "UNION". |

TABLE 21B
TRANSLATE COMBINED PRINT QUERY (CON'T.)

454 IF NO COMBINED PRINT ROW OF CPT CONTAINS AN ORDER SPEC, THEN LET OC BE EMPTY.
456 IF SOME COMBINED PRINT ROW (CPR) OF CPT CONTAINS AN ORDER SPEC, THEN:
458 LET N BE THE NUMBER OF ORDER SPECS CONTAINED IN CPR.
460 CONSTRUCT AN SQL ORDER BY CLAUSE (OC) CONTAINING N SQL SORT SPECS, WHERE, FOR i FROM 1 to N, THE i-TH SQL SORT SPEC (SSi) IS CONSTRUCTED AS FOLLOWS:
462 IF N=1, THEN LET OSi BE THE SINGLE ORDER SPEC CONTAINED IN CPR.
464 IF N>1, THEN LET OSi BE THE ORDER SPEC IN CPR WHICH CONTAINS THE INTERGER i.
466 LET SSi CONTAIN EITHER "ASC" OR "DESC", DEPENDING ON WHETHER OSi CONTAINS RESPECTIVELY "A" OR "D".
468 LET j BE THE INDEX OF THE COMBINED ENTRY IN CPR WHICH CONTAINS OSi.
470 IF THE COMBINED ROW ATTRIBUTES OF CPR CONTAIN A PRINT COMMAND, THEN LET SSi CONTAIN j.
472 IF THE COMBINED ROW ATTRIBUTESOF CPR DO NOT CONTAIN A PRINT COMMAND, THEN:
474 LET k BE THE NUMBER OF COMBINED ENTRIES IN CPR WHICH PRECEDE THE j-TH COMBINED ENTRY AND WHICH CONTAIN A PRINT COMMAND.
476 LET SSi CONTAIN k+1.
478 CONSTRUCT AN SQL INTERACTIVE SELECTION (IS) CONTAINING THE SQL QUERY EXPR (QE) AND THE SQL ORDER BY CLAUSE (OC), OMITTING OC IF IT IS EMPTY.
480 CONSTRUCT AN SQL INTERACTIVE STATEMENT (IST)

TABLE 21B-continued
TRANSLATE COMBINED PRINT QUERY (CON'T.)

CONSISTING OF INTERACTIVE SELECTION (IS).
482 RETURN IST.

TABLE 22
TRANSLATE COMBINED PRINT ROW

| | | |
|---|---|---|
| 490 | OPERATION: | TRANSLATE-COMBINED-PRINT-ROW(CPR) WHERE CPR IS A COMBINED PRINT ROW. |
| 492 | CALLED BY: | TRANSLATE-COMBINED-PRINT-QUERY. |
| 494 | RESULT: | AN SQL QUERY SPEC. |
| 496 | | LET RN BE THE ROW NAME ASSOCIATED WITH CPR. |
| 498 | | LET CPT BE THE COMBINED PRINT TABLE WHICH CONTAINS CPR. |
| 500 | | IF THE COMBINED ROW ATTRIBUTES OF CPR CONTAIN A PRINT COMMAND, THEN: |
| 502 | | LET N BE THE NUMBER OF COLUMN NAMES CONTAINED IN CPT. |
| 504 | | FOR i FROM 1 TO N: |
| 506 | | LET CNi BE THE i-TH COLUMN NAME CONTAINED IN CPT. |
| 508 | | CONSTRUCT AN SQL SELECT SPEC (SSi) CONTAINING RN.CNi. |
| 510 | | IF THE COMBINED ROW ATTRIBUTES OF CPR DO NOT CONTAIN A PRINT COMMAND, THEN: |
| 512 | | LET N BE THE NUMBER OF COMBINED ENTRIES IN CPR WHICH CONTAIN A PRINT COMMAND. |
| 514 | | FOR i FROM 1 TO N: |
| 516 | | LET j BE THE INDEX IN CPR OF THE i-TH COMBINED ENTRY WHICH CONTAINS A PRINT COMMAND. |
| 518 | | LET CNi BE THE j-TH COLUMN NAME IN CPT. |
| 520 | | CONSTRUCT AN SQL SELECT SPEC (SSi) CONTAINING RN.CNi. |
| 522 | | CONSTRUCT AN SQL SELECT LIST (SL) IN WHICH, FOR i FROM 1 TO n, THE i-TH SELECT SPEC IS SSi. |
| 524 | | LET RS BE A SET CONTAINING EXACTLY CPR. |
| 526 | | PERFORM CONSTRUCT-TABLE-EXPRESSION(RS) TO OBTAIN AN SQL TABLE EXPR (TE). |
| 528 | | IF THE COMBINED PRINT ROW HAS "UNQ" SPEC, LET THE SQL DUPLICATE SPEC (DS) BE "DISTINCT". |
| 530 | | IF THE COMBINED PRINT ROW HAS AN "ALL" SPEC OR NO "SET" SPEC, THEN LET THE SQL DUPLICATE SPEC (DS) BE EMPTY. |
| 532 | | CONSTRUCT AN SQL QUERY SPEC (QS) CONTAINING DS, THE SQL SELECT LIST (SL), AND THE SQL TABLE EXPR (TE). |
| 534 | | RETURN QS. |

TABLE 23
SIMPLE RETRIEVAL

| SELECT ENAME,DNO, SAL | EMP | ENAME | DNO | SAL |
|---|---|---|---|---|
| FROM EMP WHERE SAL > 20000 | P. | | | >20000 |

TABLE 24
DEPENDENT RETRIEVAL

| SELECT ENAME,SAL, DNO | EMP | ENAME | SAL | DNO |
|---|---|---|---|---|
| FROM EMP WHERE SAL > 20000 AND DNO = ANY | P. | | >20000 | _D |
| (SELECT DNO FROM DEPT WHERE LOC = 'SJ') | DEPT | | DNO _D | LOC SJ |

TABLE 25
TRANSLATION OF DEPENDENT QUERIES

| | EMP | ENAME | SAL | DNO |
|---|---|---|---|---|
| SELECT ENAME,SAL,DNO | P. | | >20000 | _D |
| FROM EMP #$@00001 | | | | |
| WHERE SAL > 20000 | | | | |
| AND EXISTS | | DEPT | DNO | LOC |
| (SELECT* | | | _D | SJ |
| FROM DEPT #$@00002 | | | | |
| WHERE #$@00002.LOC = 'SJ' | | | | |
| and #$@00001.DNO = #$@00002.DNO) | | | | |

TABLE 26
MULTI RETRIEVAL QUERY

| | EMP | ENAME | SAL | OTIME |
|---|---|---|---|---|
| SELECT DISTINCT ENAME,SAL,OTIME | | | | |
| FROM EMP | | | | |
| WHERE OTIME > .1*SAL | P. | | _SA | >.1*_SA |
| OR OTIME > 1200 | P. | | | >1200 |

TABLE 27
DEPENDENT RETRIEVAL

| | EMP | ENAME | SAL | COMM | DNO |
|---|---|---|---|---|---|
| SELECT ENAME,SAL,COMM,DNO | | | | | |
| FROM EMP | | | | | |
| WHERE SAL > 20000 | P. | | >20000 | | |
| OR COMM > 4000 | P. | | | >4000 | |
| UNION | P. | | | | _X |
| SELECT ENAME,SAL,COMM,X.DNO | | | | | |
| FROM EMP X, DEPT Y | | DEPT | DNO | LOC | |
| WHERE X.DNO = Y.DNO | | | | | |
| AND Y.DNO = 'SJ' | | | _D | SJ | |

TABLE 28
COMPLEX DEPENDENT RETRIEVAL

| | EMP | ENAME | SAL | MGR | DNO |
|---|---|---|---|---|---|
| SELECT ENAME, SAL | | | | | |
| FROM EMP X | | | | | |
| WHERE EXISTS | P. | | P.>_MS | _M | _D |
| (SELECT * | | | | | |
| FROM EMP Y, DEPT Z | | EMP | ENAME | SAL | |
| WHERE X.SAL > Y.SAL | | | | | |
| AND X.MGR = Y.ENAME | | | _M | _MS | |
| AND X.DNO = Z.DNO | | | | | |
| AND Z.LOC = 'SJ') | | DEPT | DNUM | LOC | |
| | | | _D | SJ | |

TABLE 29
COMPLEX DEPENDENT RETRIEVAL USING UNQ.

| | EMP | ENAME | SAL | MGR | DNO |
|---|---|---|---|---|---|
| SELECT DISTINCT ENAME,SAL | | | | | |
| FROM EMP X, EMP Y, DEPT Z | | | | | |
| WHERE X.SAL > Y.SAL | UNQ. | P. | P.>_MS | _M | _D |
| AND X.MGR = Y.ENAME | | EMP | ENAME | SAL | |
| AND X.DNO = Z.DNO | | | | | |
| AND Z.LOC = 'SJ' | | | _M | _MS | |
| | | DEPT | DNUM | LOC | |
| | | | _D | SJ | |

TABLE 30
TRANSLATE TARGET PRINT QUERY

| 340 | OPERATION: | TRANSLATE-TARGET-PRINT-QUERY |
|---|---|---|
| 342 | CALLED BY: | TRANSLATE-QUERY |
| 344 | RESULT: | AN SQL INTERACTIVE STATEMENT IST |
| 346 | LET TPT BE THE TARGET PRINT TABLE CONTAINED IN THE QBE QUERY Q. | |
| 348 | IF TPT CONTAINS EXACTLY ONE TARGET PRINT ROW TPR, THEN: | |

TABLE 30-continued
TRANSLATE TARGET PRINT QUERY

| 350 | PERFORM TRANSLATE-TARGET-PRINT-ROW(TPR), TO OBTAIN AN SQL QUERY SPEC (QS). |
|---|---|
| 352 | CONSTRUCT AN SQL QUERY EXPRESSION (QE) CONSISTING OF QS. |
| 354 | IF TPT CONTAINS N>1 TARGET PRINT ROWS, THEN: |
| 356 | FOR i FROM 1 TO N: |
| 358 | LET TPRi BE THE i-th TARGET PRINT ROW OF TPT. |
| 360 | PERFORM TRANSLATE-TARGET-PRINT-ROW(TPRi), TO OBTAIN AN SQL QUERY SPEC (QSi). |
| 362 | CONSTRUCT AN SQL QUERY EXPR (QE) CONSISTING OF THE N SQL QUERY SPECS (QSi) SEPARATED BY "UNION". |
| 364 | IF NO TARGET PRINT ROW OF TPT CONTAINS AN ORDER SPEC, THEN LET OC BE EMPTY. |
| 366 | IF SOME TARGET PRINT ROW (TPR) OF TPT CONTAINS AN ORDER SPEC, THEN: |
| 368 | LET N BE THE NUMBER OF ORDER SPECS |

TABLE 30-continued
TRANSLATE TARGET PRINT QUERY

|     | |
| --- | --- |
|     | CONTAINEDIN TPR. |
| 370 | CONSTRUCT AN SQL ORDER BY CLAUSE (OC) CONTAINING N SQL SORT SPECS, WHERE, FOR i FROM 1 TO N, THE i-th SQL SORT SPEC (SSi) IS CONSTRUCTED AS FOLLOWS: |
| 372 | IF n=1, THEN LET OSi BE THE SINGLE ORDER SPEC CONTAINED IN TPR. |
| 374 | IF n>1, THEN LET OSi BE THE ORDER SPEC IN TPR WHICH CONTAINS THE INTERGER i. |
| 376 | LET SSi CONTAIN EITHER "ASC" OR "DESC", DEPENDING ON WHETHER OSi CONTAINS RESPECTIVELY "A" OR "D". |
| 378 | LET SSi CONTAIN j, WHERE j IS THE INDEX OF THE TARGET ENTRY IN TPR WHICH CONTAINS OSi. |
| 380 | CONSTRUCT AN SQL INTERACTIVE SELECTION (IS) CONTAINING THE SQL QUERY EXPR (QE) AND THE SQL ORDER BY CLAUSE (OC), OMITTING OC IF IT IS EMPTY. |
| 382 | CONSTRUCT AN SQL INTERACTIVE STATEMENT (IST) CONSISTING OF INTERACTIVE SELECTION (IS). |
| 384 | RETURN IST. |

TABLE 31
TRANSLATE TARGET PRINT ROW

|     | | |
| --- | --- | --- |
| 400 | OPERATION: | TRANSLATE-TARGET-PRINT-ROW(TPR) WHERE TPR IS A TARGET PRINT ROW. |
| 402 | CALLED BY: | TRANSLATE-TARGET-PRINT-QUERY |
| 404 | RESULT: | AN SQL QUERY SPEC (QS) |
| 406 | LET N BE THE NUMBER OF TARGET ENTRYS IN TPR. | |
| 408 | FOR i FROM 1 TO N: | |
| 410 | LET Ei BE THE EXPRESSION OF THE i-TH TARGET ENTRY OF TPR. | |
| 412 | REPLACE ALL OCCURRENCES OF AN EXAMPLE ELEMENT (EE) WITH AN EXAMPLE ELEMENT NAME (RN.CN) CREATED FOR ANY EXAMPLE ELEMENT DEFINITION OF EE. | |
| 414 | CONSTRUCT AN SQL SELECT LIST (SL) IN WHICH, FOR i FROM 1 TO N, THE i-TH SQL SELECT SPEC IS AN SQL COLUMN EXPR CONSISTING OF SEi. | |
| 416 | LET RS BE THE SET OF ALL SOURCE ROWS IN THE QBE QUERY Q WHICH ARE REFERRED TO BY THE EXPRESSION OF AT LEAST ONE TARGET ENTRY OF TPR. | |
| 418 | PERFORM CONSTRUCT-TABLE-EXPRESSION(RS) TO OBTAIN AN SQL TABLE EXPR (TE). | |
| 420 | IF THE TARGET PRINT ROW HAS "UNQ" SPEC, LET THE SQL DUPLICATE SPEC (DS) BE "DISTINCT". | |
| 422 | IF THE TARGET PRINT ROW HAS AN "ALL" SPEC OR NO "SET" SPEC, THEN LET THE SQL DUPLICATE SPEC (DS) BE EMPTY. | |
| 424 | CONSTRUCT AN SQL QUERY SPEC (QS) CONTAINING DS, THE SQL SELECT LIST (SL), AND THE SQL TABLE EXPR (TE). | |
| 426 | RETURN QS. | |

TABLE 32
TARGET RETRIEVAL

SELECT ENAME,DNAME,SAL+COMM
FROM EMP X DEPT Y
WHERE X.DNO = 49
AND DIV = 121
AND X.DNO = Y.DNO

|       |       | P.    | _E    | _D    | _S+_C |
| ----- | ----- | ----- | ----- | ----- | ----- |
| EMP   | ENAME | DNO   | DNO   | SAL   | COMM  |
|       | _E    | _M    | 49    | _S    | _C    |
|       |       | DEPT  | DNO   | DIV   | DNAME |
|       |       |       | _M    | 121   | _D    |

TABLE 33
MULTI TARGET RETRIEVAL

SELECT DISTINCT ENAME,SAL
FROM EMP
WHERE DNO = 46
UNION
SELECT NAME,SAL
FROM HQLOC
WHERE DV# = 405

|       | P.    | _E    | _S    |       |
| ----- | ----- | ----- | ----- | ----- |
|       | P.    | _D    | _HS   |       |
|       | HQLOC | NAME  | SAL   | DV#   |
|       |       | _D    | _HS   | 405   |
|       | EMP   | ENAME | SAL   | DNO   |
|       |       | _E    | _S    | 46    |

TABLE 34
OUTER JOIN

SELECT ENAME,DV#,SAL+OTIME
FROM EMP W, HQLOC X
WHERE X.LOC = 'WP'
AND W.DNO = X.DNO
AND EXISTS
(SELECT *
FROM DEPT Y SKILLS Z
WHERE Y.LOC = 'SJ'
AND Z.SKLNO = 22
AND Y.DNO = W.DNO
AND Z.DNO = W.DNO)

|        | P.    | _N    |       | _DV   | _SA+_CO |
| ------ | ----- | ----- | ----- | ----- | ------- |
|        | EMP   | ENAME | SAL   | OTIME | DNO     |
|        |       | _N    | _SA   | _CO   | _D      |
|        | HQLOC | DV#   | DNO   | LOC   |         |
|        |       | _DV   | _D    | WP    |         |
|        | DEPT  | DNO   | LOC   |       |         |
|        |       | _D    | SJ    |       |         |
|        | SKILLS| SKLNO | LOC   | DNO   |         |

TABLE 34-continued

| OUTER JOIN | | | |
|---|---|---|---|
| | 22 | SJ | _D |

TABLE 35

| MULTI TARGET P.s | | | |
|---|---|---|---|
| SELECT ENAME,SAL | | | |
| FROM EMP | P. | _E | _S |
| UNION | P. | _N | _SA |
| SELECT NAME,SALARY | | | |
| FROM MGR | EMP | ENAME | SAL |
| | | _E | _S |
| | MGR | NAME | SALARY |
| | | _N | _SA |

TABLE 36

TRANSLATE DELETE QUERY

640 OPERATION: TRASLATE-DELETE-QUERY.
642 CALLED BY: TRANSLATE-QUERY
644 RESULT: AN SQL INTERACTIVE STATEMENT.
646 LET DT BE THE DELETE TABLE CONTAINED IN THE QUERY Q.
648 LET TN BE THE TABLE NAME CONTAINED IN DT.
650 LET RN BE THE SQL RELATION NAME ASSOCIATED WITH THE DELETE ROW OF DT.
652 LET CS BE THE SET OF ALL CONDITIONS IN THE QUERY Q.
654 IF CS IS THE EMPTY SET, THEN LET WC BE EMPTY.
656 IF CS IS NOT THE EMPTY SET, THEN:
658 LET DR BE THE DELETE ROW OF DT.
660 LET DRS BE A SET CONTAINING EXACTLY DR.
662 PERFORM CONSTRUCT-SEARCH-CONDITION(CS,DRS,QT), TO OBTAIN AN SQL SEARCH CONDITION (SC).
664 CONSTRUCT AN SQL WHERE CLAUSE (WC) CONTAINING THE SQL SEARCH CONDITION (SC).
666 CONSTRUCT AN SQL ROW DELETION (RD) CONTAINING THE SQL TABLE NAME (TN), THE SQL RELATION NAME (RN), AND THE SQL WHERE CLAUSE (WC), OMITTING WC IF IT IS EMPTY.
668 CONSTRUCT AN SQL INTERACTIVE STATEMENT (IST) CONSISTING OF RD.
670 RETURN IST.

TABLE 37

| SIMPLE DELETES | | | |
|---|---|---|---|
| DELETE | EMP | ENAME | DNO |
| FROM EMP | | | |
| WHERE DNO = 77 | D. | 'JAMES JONES' | 77 |
| AND ENAME = | | | |
| 'JAMES JONES' | | | |

TABLE 38

| DEPENDENT DELETE | | | |
|---|---|---|---|
| DELETE | EMP | DNO | |
| FROM EMP | | | |
| WHERE DNO IN | D. | _M | |
| (SELECT DNO | | | |
| FROM DEPT X, HQLOC Y | DEPT | DNO | DIV |
| WHERE X.DIV = Y. DV# | | | |
| AND LOCN = | | _M | _E |
| 'SCRANTON') | | | |
| | HQLOC | DV# | LOCN |
| | | _E | SCRANTON |

TABLE 39

| MULTI DELETE QUERY | | |
|---|---|---|
| DELETE | EMP | DNO |

TABLE 39-continued

| MULTI DELETE QUERY | | | |
|---|---|---|---|
| FROM EMP | | | |
| WHERE DNO IN | D. | _M | |
| (SELECT DNO | D. | _D | |
| FROM DEPT X, HQLOC Y | | | |
| WHERE X.DIV = Y.DV# | DEPT | DNO | DIV |
| AND LOCN = | | | |
| 'SCRANTON') | | | |
| OR DNO IN | | _M | _E |
| (SELECT DNO | | | |
| FROM DEPT | HQLOC | DV# | LOCN |
| WHERE LOC = 'SJ') | | | |
| | | _E | SCRANTON |
| | DEPT | DNO | LOC |
| | | _D | SJ |

TABLE 40

TRANSLATE UPDATE QUERY

590 OPERATION: TRANSLATE-UPDATE-QUERY.
592 CALLED BY: TRANSLATE-QUERY.
594 RESULT: AN SQL INTERACTIVE STATEMENT.
596 LET UT BE THE UPDATE TABLE CONTAINED IN THE QUERY Q.
598 LET TN BE THE TABLE NAME CONTAINED IN UT.
600 LET RN BE THE SQL RELATION NAME ASSOCIATED WITH THE SOURCE ROW OF UT.
602 LET CS BE THE SET OF ALL CONDITIONS IN THE QUERY Q.
604 IF CS IS THE EMPTY SET, THEN LET WC BE EMPTY.
606 IF CS IS NOT THE EMPTY SET, THEN:
608 PERFORM CONSTRUCT-TABLE-EXPRESSION(RS) TO OBTAIN AN SQL TABLE EXPRESSION (TE).
610 CONSTRUCT AN SQL QUERY SPEC (QS) CONTAINING DS, THE SQL SELECT LIST (SL), AND THE SQL TABLE EXPR (TE).
612 LET UR BE THE UPDATE ROW OF UT.
614 LET N BE THE NUMBER OF UPDATE ENTRIES IN UR WHICH ARE UPDATE ITEMS.
616 FOR i FROM 1 TO N:
618 LET j BE THE INDEX IN UR OF THE i-TH UPDATE ENTRY WHICH CONTAINS AN UPDATE ITEM.
620 LET CNi BE THE j-TH COLUMN NAME IN UT.
622 IF THE j-TH UPDATE ENTRY OF UR CONTAINS A NULL SYMBOL, THEN LET SEi BE "NULL".
624 IF THE j-TH UPDATE ENTRY OF UR CONTAINS AN EXPRESSION (E), THEN REPLACE ALL OCCURRENCES OF AN EXAMPLE ELEMENT (EE) WITH AN EXAMPLE ELEMENT NAME (RN.CN) CREATED FOR ANY EXAMPLE ELEMENT DEFINITION OF EE.
626 CONSTRUCT AN SQL SET CLAUSE (SCi) CONTAINING CNi AND SEi.
628 CONSTRUCT AN SQL ROW UPDATE (RU) CONTAINING THE SQL TABLE NAME (TN), THE RELATION NAME (RN), THE N SQL SET CLAUSES (SCi), AND

TABLE 40-continued
TRANSLATE UPDATE QUERY

| | |
|---|---|
| | THE SQL QUERY SPEC (QS), OMITTING QS IF CS IS EMPTY. |
| 630 | CONSTRUCT AN SQL INTERACTIVE STATEMENT (IST) CONSISTING OF RU. |
| 632 | RETURN IST. |

TABLE 41
SIMPLE UPDATE

| UPDATE EMP | EMP | DNO | DNO |
|---|---|---|---|
| SET DNO = 77 | | | |
| WHERE DNO = 66 | | 66 | U.77 |

TABLE 42
DEPENDENT UPDATE

| UPDATE EMP | EMP | DNO | DNO |
|---|---|---|---|
| SET DNO = 77 | | | |
| WHERE DNO IN | | _M | U.77 |
| (SELECT DNO | | | |
| FROM DEPT X. HQLOC Y | DEPT | DNO | DIV |
| WHERE X.DIV = Y.DV# | | | |
| AND LOCN = | | _M | _E |
| 'SCRANTON') | | | |
| | HQLOC | DV# | LOCN |
| | | _E | SCRANTON |

TABLE 43
TRANSLATE INSERT QUERY

| | | |
|---|---|---|
| 540 | OPERATION: | TRANSLATE-INSERT-QUERY |
| 542 | CALLED BY: | TRANSLATE-QUERY |
| 544 | RESULT: | AN SQL INTERACTIVE STATEMENT |
| 546 | LET IT BE THE INSERT TABLE CONTAINED IN THE QUERY Q. | |
| 548 | LET TN BE THE TABLE NAME CONTAINED IN IT. | |
| 550 | LET CL BE AN SQL COLUMN LIST CONTAINING THE COLUMN NAMES OF IT IN THE ORDER IN WHICH THEY APPEAR IN IT. | |

TABLE 43-continued
TRANSLATE INSERT QUERY

| | |
|---|---|
| 552 | LET IR BE THE INSERT ROW OF IT. |
| 554 | IF EACH INSERT ENTRY OF IR CONTAINS EITHER A NULL SYMBOL OR AN EXPRESSION WHICH CONSISTS SOLELY OF A CONSTANT, THEN: |
| 556 | LET VL BE AN SQL VALUE LIST CONTAINING THE CONSTANT OR THE NULL SYMBOL INSERT ENTRIES OF IR IN THE ORDER IN WHICH THEY APPEAR IN IR. |
| 558 | LET RI BE AN SQL ROW INSERTION CONTAINING THE SQL TABLE NAME TN, THE SQL COLUMN LIST CL, AND THE SQL VALUE LIST VL. |
| 560 | LET IST BE AN SQL INTERACTIVE STATEMENT CONSISTING OF RI. |
| 562 | RETURN IST. |
| 564 | LET N BE THE NUMBER OF INSERT ENTRIES CONTAINED IN IR. |
| 566 | FOR i FROM 1 TO N: |
| 568 | IF THE i-TH INSERT ENTRY OF IR IS THE NULL SYMBOL, THEN LET SEi BE "NULL". |
| 570 | IF THE i-TH INSERT ENTRY OF IR IS AN EXPRESSION Ei, THEN REPLACE ALL OCCURRENCES OF AN EXAMPLE ELEMENT (EE) WITH AN EXAMPLE ELEMENT NAME (RN.CN) CREATED FOR ANY EXAMPLE ELEMENT DEFINITION OF EE. |
| 572 | CONSTRUCT AN SQL SELECT LIST (SL) WHOSE i-TH SELECT SPEC IS SEi. |
| 574 | LET RS BE THE SET OF ALL SOURCE ROWS REFERRED TO BY THE EXPRESSION OF AT LEAST ONE INSERT ENTRY OF IR. |
| 576 | PERFORM CONSTRUCT-TABLE-EXPRESSION(RS), TO OBTAIN AN SQL TABLE EXPR (TE). |
| 578 | LET THE DUPLICATES SPEC (DS) BE EMPTY. |
| 580 | CONSTRUCT AN SQL QUERY SPEC (QS) CONTAINING DS, THE SQL SELECT LIST (SL), AND THE SQL TABLE EXPR (TE). |
| 582 | CONSTRUCT AN SQL ROW INSERTION (RI) CONTAINING THE SQL TABLE NAME (TN), THE SQL COLUMN LIST (CL), AND THE SQL QUERY SPEC (QS). |
| 584 | CONSTRUCT AN SQL INTERACTIVE STATEMENT IST CONSISTING OF RI. |
| 586 | RETURN IST. |

TABLE 44
SIMPLE INSERT

| INSERT INTO EMP (ENAME,MNO) VALUES 'JAMES JONES',579) | EMP | ENAME | MNO |
|---|---|---|---|
| | I. | 'JAMES JONES' | 579 |

TABLE 45
DEPENDENT INSERT

| INSERT INTO EMP (ENAME,MNO,DNO) | EMP | ENAME | MNO | DNO |
|---|---|---|---|---|
| SELECT NAME,MNO, '79' | | | | |
| FROM HQLOC | I. | _N | _M | '79' |
| WHERE DNO 'J79' | | | | |
| | HQLOC | NAME | MNO | DNO |
| | | _N | _M | _D |

TABLE 48
CONDITIONS REFERENCE

| SELECT DISTINCT ENAME, SAL,OTIME FROM EMP WHERE (DNO = 46 AND SAL > 2000 OR OTIME > 1000) AND ENAME LIKE'%SMITH' AND DNO = 48. | EMP | ENAME | SAL | OTIME | DNO | DNO |
|---|---|---|---|---|---|---|
| | UNQ. | P._N | P._SA | P._OT | _D | 48 |

| CONDITIONS |
|---|
| _D=46 AND _SA>20000 OR _OT>1000 |

CONDITIONS

TABLE 48-continued
CONDITIONS REFERENCE

_N LIKE '%SMITH'

TABLE 46
CONSTRUCT TABLE EXPRESSION

| | | |
|---|---|---|
| 680 | OPERATION: | CONSTRUCT-TABLE-EXPRESSION(RS) WHERE RS IS A SET OF ROWS. |
| 682 | CALLED BY: | TRANSLATE-TARGET-PRINT-ROW, TRANSLATE-COMBINED-PRINT-ROW, TRANSLATE-UPDATE-QUERY, AND TRANSLATE-INSERT-QUERY. |
| 684 | RESULT: | AN SQL TABLE EXPR. |
| 686 | | CONSTRUCT AN SQL "FROM" CLAUSE SUCH THAT FOR EACH ROW (R) OF RS, FC CONTAINS EXACTLY ONE PAIR "TN RN", WHERE TN IS THE TABLE NAME CONTAINED IN THE TABLE WHICH CONTAINS R, AND RN IS THE SQL RELATION NAME ASSOCIATED WITH R. |
| 688 | | LET OC BE THE SET OF ALL CONDITIONS IN THE QUERY Q THAT ARE SATISFIED BY RS. |
| 690 | | IF OC IS NOT EMPTY THEN: |
| 692 | | CONSTRUCT AN SQL SEARCH CONDITION (SCi) CONSISTING OF (OC1)AND(OC2)... AND(OCi) FOR THE i MEMBERS OF OC. |
| 694 | | LET TEC BE THE SET OF ALL CONDITIONS IN THE QUERY Q, EACH OF WHICH REFERENCE MEMBERS OF RS BUT ARE NOT SATISFIED BY RS. |
| 696 | | IF TEC IS NOT EMPTY THEN: |
| 698 | | LET CRS AND SC BE THE EMPTY SETS. |
| 700 | | PERFORM CONSTRUCT-SEARCH-CONDITION(RS,CRS,TEC). |
| 702 | | IF OC OR TEC IS NOT THE EMPTY SET, THEN: |
| 704 | | CONSTRUCT AN SQL "WHERE" CLAUSE (WC) CONTAINING THE SQL SEARCH CONDITIONS SC1 AND SC3. |
| 706 | | CONSTRUCT AN SQL TABLE EXPR (TE) CONTAINING THE SQL "FROM" CLAUSE (FC) AND THE SQL "WHERE" CLAUSE, OMITTING THE "WHERE" CLAUSE WHEN SUCH A CLAUSE IS EMPTY. |
| 708 | | RETURN TE. |

TABLE 47
CONSTRUCT SEARCH CONDITIONS

| | | |
|---|---|---|
| 720 | OPERATION: | CONSTRUCT-SEARCH-CONDITIONS(CRS,RS,TEC) WHERE CRS IS A SET OF ROWS, AND RS IS A SET OF ROWS, AND TEC IS A SET OF CONDITIONS. |
| 722 | CALLED BY: | TRANSLATE-UPDATE-QUERY, TRANSLATE-DELETE-QUERY, CONSTRUCT-TABLE-EXPRESSION, CONSTRUCT-SEARCH-CONDITION. |
| 724 | RESULT: | AN SQL SEARCH CONDITION (SC3). |
| 726 | | FOR EACH CONDITION IN TEC: |
| 728 | | INSERT EACH ROW REFERRED TO BY THE CONDITION THAT IS NOT IN RS INTO CRS. |
| 730 | | FOR EACH CONDITION C IN THE QUERY Q THAT REFERS TO A ROW IN CRS THAT IS NOT ALREADY IN TEC, INSERT THE CONDITION IN THE TEC. |
| 732 | | PERFORM CONSTRUCT-SEARCH-CONDITION UNTIL NO ENTRIES ARE MADE INTO EITHER CRS OR TEC. |
| 734 | | CONSTRUCT AN SQL SEARCH CONDITION (SC1) CONSISTING OF (TEC1)AND(TEC2)... AND(TECi) WHERE i IS THE NUMBER OF MEMBERS OF TEC. |
| 736 | | CONSTRUCT AN SQL WHERE CLAUSE (WC1) CONTAINING THE SQL SEARCH CONDITION SC1. |
| 738 | | CONSTRUCT AN SQL FROM CLAUSE FC1 SUCH THAT FOR EACH ROW (CR) OF CRS, FC CONTAINS EXACTLY ONE PAIR "TN CRN", WHERE TN IS THE TABLE NAME CONTAINED IN THE TABLE WHICH CONTAINS CR, AND CRN IS THE SQL RELATION NAME ASSOCIATED WITH CR. |
| 740 | | CONSTRUCT AN SQL TABLE EXPRESSION (TE1) CONTAINING THE SQL FROM CLAUSE (FC1) AND THE SQL WHERE CLAUSE (WC1). |

TABLE 47-continued
CONSTRUCT SEARCH CONDITIONS

| | | |
|---|---|---|
| 742 | | CONSTRUCT AN SQL SEARCH CONDITION (SC3) CONSISTING OF "EXISTS SELECT*" FOLLOWED BY THE SQL TABLE EXPRESSION TE1. |
| 744 | | RETURN. |

TABLE 49

| Abbreviations | |
|---|---|
| A | Ascending |
| CL | SQL Column List |
| CN | Column Name |
| CPR | Combined Print Row |
| CPT | Combined Print Table |
| CRN | SQL Relation Name associated with CR |
| CRS | Child of RS |
| CS | Set of Conditions |
| D | Descending |
| DR | Delete Row |
| DRS | Set containing exactly DR |
| DS | SQL Duplicate Specification |
| DT | Delete Table |
| D. | Delete Query |
| E | Expression |
| EE | Example Element |
| EED | Example Element Definition |
| FC | SQL From Clause |
| i | Integer |
| | Index, or control variable |
| I. | Insert Query |
| j | Index, or control variable |
| IOP | Implied Operand Predicate |
| IR | Insert Row |
| IS | SQL Interactive Selection |
| IST | SQL Interactive Statement |
| IT | Insert Table |
| k | Index, or control variable |
| LCRS | Row Linked to member of CRS |
| N | Ordinal value |
| NFCS | Set of All Conditions in Q |
| OC | SQL Order by Clause |
| OS | Single Order Specification |
| P | Basic Predicate |
| P. | Print (Display) Query |
| Q | QBE Query |
| QBE | Query By Example |
| QE | SQL Query Expression |
| QS | SQL Query Specification |
| QT | Query Tree |
| R | Row |
| RD | SQL Row Deletion |
| RI | SQL Row Insertion |
| RN | Row Name |
| | SQL Relation Name |
| RN.CN | Example Element Name |
| | Example Element Definition |
| RN.CN(i)=RN.CN(1) | Basic Predicate (See also, P) |
| RS | Source Rows |
| RU | SQL Row Update |
| SC | SQL Search Condition |
| | SQL Set Clause |
| SCS | Set of SQL Search Conditions |
| SC2 | SQL Search Condition |
| SC3 | SQL Search Condition |
| SC4 | SQL Search Condition |
| SE | SQL Column Expression |
| SL | SQL Select List |
| SQL | Sequel Query Language |
| SS | SQL Sort Specification |
| | SQL Select Specification |
| TE | SQL Table Expression |
| TN | SQL Table Name |
| | Table Name |
| TPR | Target Print Row |

TABLE 49-continued

| Abbreviations | |
|---|---|
| TPT | Target Print Table |
| UR | Update Row |
| UT | Update Table |
| U. | Update Query |
| VL | SQL Value List |
| WC | SQL Where Clause |

We claim:

1. A method for operating a computing apparatus to translate into a linear query a graphic language query expressed as one or more elements, including example elements and implied operand predicates, appearing in rows and columms of an example table including one or more source and target tables and, optionally, in condition blocks, comprising the steps of:

generating row names into a row name table having one entry for each row in a source table;

for each data field within each row named in said row name table which contains an example element definition or implied operand predicate, generating and loading into a column data table an entry specifying the row name, column name, and data; and generating into a conditions table an entry containing a basic predicate for each column data table entry containing an implied operand predicate or an example element having an implied condition;

thereby establishing in said row name table, column data table, and conditions table a data structure for synthesizing into a linear query a graphic language query specified as a target point query, or a combined print query, or an insert query, or an update query, or a delete query.

2. The method of claim 1, comprising the further steps of determining from said column data table the row name and column name for example elements referenced in the condition block, and responsive thereto generating into said conditions table a condition entry for each condition specified in a condition block.

3. The method of claim 1, comprising the further step of substituting parameters passed in said graphic language query prior to building said data structure.

4. The method of claim 1, comprising the further step, responsive to said graphic language query being a combined print query expressed as a print command appearing in a source table, of synthesizing a linear select query.

5. The method of claim 4 wherein said linear select query is synthesized according to the steps of:

identifying as simple P. rows those rows in a source table containing a print command which is not linked to any other row, and as dependent P. rows those rows in a source table which are linked to one or more other rows;

generating for all simple P. rows a single select statement including in a FROM clause the name of said source table, and in a WHERE clause the ANDing of conditions that reference a simple P. row and, if there are more than one simple P. rows, for each simple P. row in excess of one the ORing of conditions that reference one simple P. row with those conditions that reference another simple P. row;

generating for each dependent P. row a select statement including (1) in a FROM clause the table name of the table containing the P. row and the table name of the table containing a linked P. row for each such linked P. row, each table name being associated with a correlation variable, and (2) in a WHERE clause the ANDing of all conditions that reference the linked rows in the FROM clause; and generating as said linear select query the UNION of all generated select statements.

6. The method of claim 1, comprising the further step, responsive to said graphic language query being a target print query expressed as a print command appearing in a target table, of synthesizing a linear select query.

7. The method of claim 6 wherein said linear select query is synthesized according to the steps of:

generating for each target row of a target table containing a print command P. a select statement including (1) in a SELECT clause a list of constants and expressions that appear in or are referenced by the data fields of the target row for which the select statement is being generated; (2) in a FROM clause the table name and associated correlation variable for each table containing the target or a linked row; and (3) in a WHERE clause the logical ANDing of any conditions that reference rows that are referenced in the target row;

responsive to the target print query including a sort specification, generating an ORDER BY clause; and generating as said linear select query any generated ORDER BY clause and the UNION of all generated select statements.

8. The method of claim 1, comprising the further step, responsive to said graphic language query being an insert query expressed as an insert command appearing in an example table, of synthesizing a linear insert query.

9. The method of claim 8, wherein said linear insert query is synthesized according to the steps of:

identifying as a simple I. row a row containing only an insert command and constant values, and as a complex I. row a row containing an insert command and one or more example elements linking the complex I. row to one or more linked rows;

responsive to said insert command appearing in a simple I. row, generating only an insert statement;

responsive to said insert command appearing in a complex I. row, generating an insert statement and a single select statement, the select statement including a SELECT clause, a FROM clause, and a WHERE clause; the SELECT clause containing constants and expressions appearing in the data fields of the complex I. row and references to columns in other rows linked to the complex I. row; the FROM clause including the table names of all tables containing the complex I. row and any linked row, each such table name being associated with a correlation variable; and the WHERE clause including the logical ANDing of all conditions that reference rows that are referenced in the complex I. row;

generating said linear insert query to include said insert statement and any generated select statement.

10. The method of claim 1, comprising the further step, responsive to said graphic language query being a delete query expressed as a delete command appearing in a source table, of synthesizing a linear delete query.

11. The method of claim 10, wherein said linear delete query is synthesized according to the steps of:

identifying as a D. row each row in a source table containing a delete command;

identifying as a linked row (1) each row referenced by the same condition, and (2) each linked row linked to a same row;

identifying as a dependent row each linked row that is linked to a D. row;

generating a condition statement for each D. row, including (1) generating in an outer query a delete statement including (a) in a DELETE FROM clause the table name of the source table containing the D. row; (b) in a WHERE clause the logical ANDing of conditions which reference only said each D. row and, using an EXISTS comparison operator, any generated sub-queries; and (2) generating a sub-query for each set of dependent rows linked to said each D. row, a subquery including (a) in a SELECT* FROM clause the logical ANDing of all table names of tables within the set of dependent rows, each table name being associated with correlation variable; and (b) in a WHERE clause the logical ANDing of conditions that reference the set of dependent rows; and generating as said linear delete query the logical ORing of the condition statements generated for each D. row.

12. The method of claim 1, comprising the further step, responsive to said graphic language query being an update query expressed as an update command, of synthesizing a linear update query.

13. The method of claim 12, wherein said linear update query is synthesized according to the steps of:

identifying as a simple update query an update query U. appearing in a U. row that is not linked to another row, and as a dependent update query an update query U. appearing in a row that is linked to one or more other rows;

for a simple update query, generating (1) in a SET clause constant values and expressions in the U. row referencing other columns in the U. row; and (2) in a WHERE clause the logical ANDing of any conditions that reference only the U. row;

for a dependent update query, generating in an outer query (1) in a SET clause constant values and expressions in the U. row referencing other columns in the U. row; (2) in a WHERE clause the logical ANDing of any conditions that reference only the U. row and, using an EXISTS comparison operator, any generated subqueries; and generating in a sub-query (1) in a SELECT* FROM clause the table names of tables containing a linked row for each such linked row, each table name being associated with a correlation variable; and (2) in a WHERE clause the logical ANDing of all conditions that reference the linked rows; and generating said linear update query to include a SET clause and any generated WHERE clause and sub-query.

14. A computing apparatus for translating into a linear query a graphic language query expressed as one or more elements, including example elements and implied operand predicates, appearing in rows and columns of an example table including one or more source and target tables and, optionally, in condition blocks, comprising:

means for generating row names into a row name table having one entry for each row in a source table;

means, operable for each data field within each row named in said row name table which contains an example element definition or implied operand predicate, for generating and loading into a column data table an entry specifying the row name, column name, and data;

means for generating into a conditions table an entry containing a basic predicate for each column data table entry containing an implied operand predicate or an example element having an implied condition;

thereby establishing in said row name table, column data table, and conditions table a data structure for synthesizing into a linear query a graphic language query specified as a target print query, or a combined print query, or an insert query, or an update query, or a delete query.

* * * * *